United States Patent [19]

Aker et al.

[11] 4,236,140
[45] Nov. 25, 1980

[54] TRAFFIC RADAR DEVICE

[75] Inventors: John L. Aker, Merriam; William D. Goodson, Chanute, both of Kans.

[73] Assignee: Kustom Electronics, Inc., Shawnee Mission, Kans.

[21] Appl. No.: 896,376

[22] Filed: Apr. 14, 1978

[51] Int. Cl.$^3$ ............................................. G01S 13/58
[52] U.S. Cl. ..................................... 343/8; 343/5 DP
[58] Field of Search .................................. 343/8, 5 DP

[56] References Cited

U.S. PATENT DOCUMENTS

| Re. 29,401 | 9/1977 | Aker et al. | 343/8 |
| 3,148,015 | 9/1964 | Weaver | 343/8 X |

OTHER PUBLICATIONS

Electronics, Sep. 15, 1977, pp. 44, 46.

*Primary Examiner*—Maynard R. Wilbur
*Assistant Examiner*—Richard E. Berger
*Attorney, Agent, or Firm*—Lowe, Kokjer, Kircher, Wharton & Bowman

[57] ABSTRACT

A traffic radar device has a microprocessor controlled system for facilitating the Doppler signal processing. Related circuits enable the Doppler signal to be gathered on a digital basis and arrayed in the memory of the microprocessor unit. The array is then examined and by executing a predetermined algorithm, a decision is made as to whether or not a series of samples of Doppler signals, comprises within the array, represents a valid signal suitable for display as a number indicative of speed of a target vehicle.

The microprocessor also controls a tracking filter system over the expected Doppler frequency range and has a duty factor modulation and tunable notch to facilitate the filter operation.

The radar device includes a range control that limits the range of the detection of the target vehicle without affecting the detection of the platform vehicle speed. A hold mode is provided with respect to the radar device so that radiated RF energy is controlled to decrease the probability of detection by a traffic radar detector. The radar device is also capable of converting from one unit of measure to another without modification of the associated time base. As a further check on accuracy, the device includes the ability to determine the calibration of the time base within the radar system and to control the display based on the time base calibration. High speed lock onto a target vehicle speed is also provided along with the unique "power-on" calibration sequence.

26 Claims, 17 Drawing Figures

Fig. 3a.

EXAMPLE A    STATIONARY ARRAY WITH NOISE

EXAMPLE B    ARRAY WITH NEGATIVE SKEW

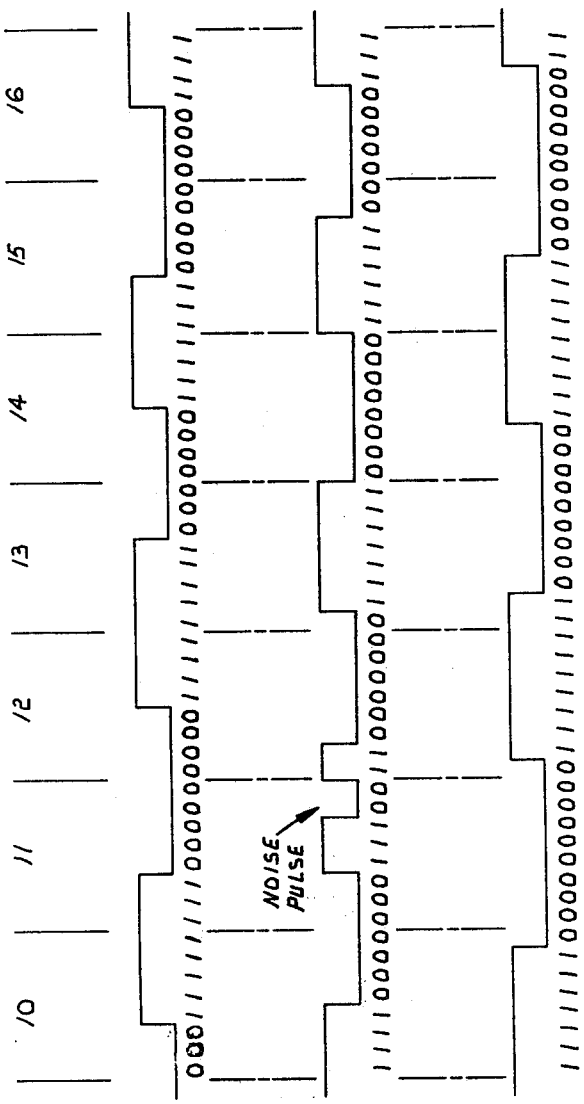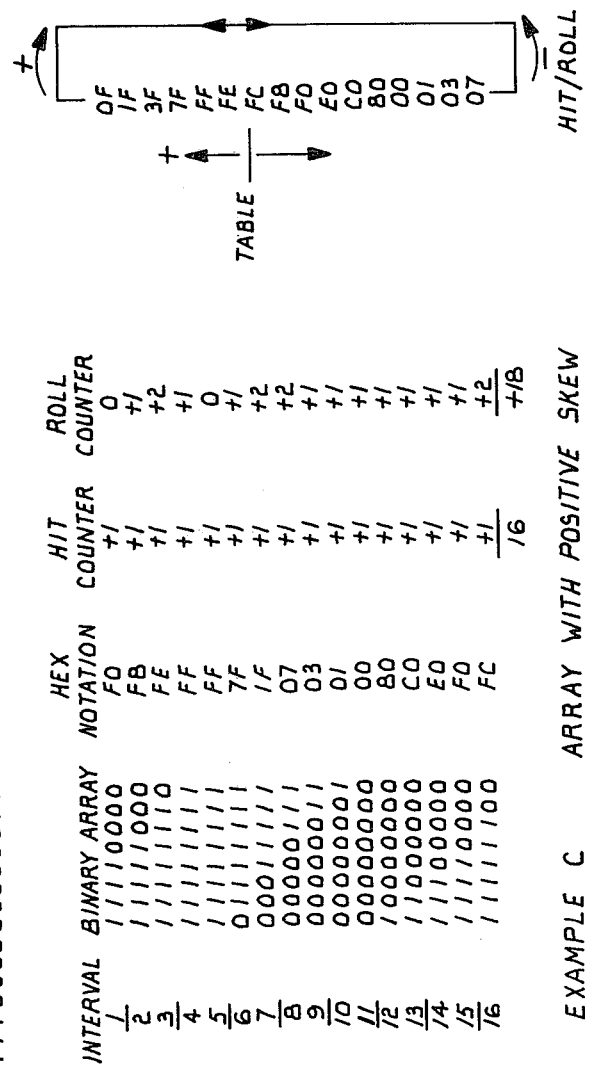

Fig. 5.

```
         ( NMI )
            │
            ▼
┌──────────────────────┐
│ PUSH PROGRAM COUNTER,│
│ PROCESSOR STATUS     │
│ ACCUMULATORS & INDEX │
│ REG ON STACK         │
└──────────────────────┘
            │
            ▼
┌──────────────────────┐
│ LOAD X FROM          │
│ BYTE COUNTER         │
│ X ← BYTCNT           │
└──────────────────────┘
            │
            ▼
┌──────────────────────┐
│ GET FIRST BYTE FROM  │
│ SSDA STORE AT ARRAY  │
│ -1+X MEM LOCATION    │
└──────────────────────┘
            │
            ▼
┌──────────────────────┐
│ GET SECOND BYTE      │
│ COMPLEMENT IT STORE  │
│ AT ARRAY -2+X MEM    │
│ LOCATION             │
└──────────────────────┘
            │
            ▼
┌──────────────────────┐
│ SUBTRACT 2           │
│ FROM X               │
│ X ← X-2              │
└──────────────────────┘
            │
            ▼
        ◇ X=0? ◇ ──YES, FINISHED LOADING──┐
            │                              │
            NO                             ▼
            │                ┌──────────────────────┐
            │                │ DISABLE THE          │
            │                │ INTERRUPT ENABLE     │
            │                │ OF SSDA              │
            │                └──────────────────────┘
            ▼◄───────────────────────┘
┌──────────────────────┐
│ SAVE X IN            │
│ BYTCNT               │
│ BYTCNT ← X           │
└──────────────────────┘
            │
            ▼
┌──────────────────────┐
│ PULL OLD REGISTER,   │
│ ACC., STATUS & RESTORE│
│ TO CONDITION BEFORE  │
│ NMI                  │
└──────────────────────┘
            │
            ▼
      ( RESTORE
        OLD PROGRAM
        COUNTER
        & RETURN )
```

Fig. 6.

```
              SSDA INITIALIZATION
                   INITSS
LDAA   #$0B    AC2, AC1 = 0,0
STAA   SSDC1   THIS ACCESSES C2 WITH NO
               INTERRUPT ENABLED, SYNC CLEARED,
               AND RECEIVER RESET
LDAA   #$19    NO ERROR INTERRUPT ENABLE, NO
               SYNC ON TX UNDERFLOW, WORD
               LENGTH = 8, NO PARITY, TWO BYTE
               TRANSFER & SYNC MATCH MODE
LDAA   #$4B    THIS ACCESSES C3
STAA   SSDC1
LDAA   #$E     NO TUF STATUS, CLEAR CTS STATUS BIT
STAA   SSDC3   ONE SYNC CHAR. MODE &
               INTERNAL SYNC.
LDAA   #$8B    AC2, AC1 = 1,0
STAA   SSDC1   THIS ACCESS THE SYNC CODE REG.
LDAA   #$OF    FIRST MEMORY LOAD WILL BE FO
STA    SSDSYN  AS OF WILL SYNC & BE
               STRIPPED
LDAA   #$22    ENABLE RESYNCRONIZATION,
               RECEIVER INTERRUPT AND
STA    SSDC1   END RX RESET
RTS
```

Fig. 9d.

| Fig. 9a. | Fig. 9b. | Fig. 9c. |

A FLOWCHART OF A PORTION OF THE EXECUTIVE ROUTINE SHOWING THE HIGH SPEED LOCK LOGIC

TRAFFIC RADAR DEVICE

BACKGROUND AND BRIEF DESCRIPTION OF THE INVENTION

This invention relates to a unique signal processing scheme in the digital traffic radar field and represents an improvement in the art over that generally shown in the patents to Fathauer, U.S. Pat. No. 3,438,031; Berry, U.S. Pat. No. 3,689,921 and Aker, et al., U.S. Pat. No. 3,936,824. This signal processing scheme includes a means for gathering Doppler signal as a digital basis after the squaring and arraying of same in the memory of a microprocessor unit. The term arraying will be described in detail in a later part of this disclosure; however, for purposes of this brief discussion, the term "arraying" may be thought of as collecting a series of samples of the Doppler signal and causing the samples to be "arrayed" within a series of memory locations. Following this arraying, the associated microprocessor will examine the array and by executing a predetermined algorithm, a decision will be made as to whether a valid signal, suitable for computing a display number as an indication of speed, exists within the array.

The invention also includes a unique tracking filter system which is controllable over the expected Doppler frequency range. It has "duty factor modulation" as a means for controlling the effective values of the RC time constants within the filter elements. This filter has a band-pass system which is used for tracking the patrol car (host vehicle) speed (Doppler signal). It also has a high pass filter with a Bessel-type high pass function which contains a notch (zero of response) at the edge of its stopband. The operation of the system is generally such to place the notch on the patrol car speed frequency so that the patrol car speed signal is removed from the composite signal and passed onto the signal processing elements. These two filters are also under microprocessor control and are selected and controlled by it depending upon which operation is being performed.

Known moving radar prior art has various means for determining signal validity. The first known commercially successful digital police radar is believed to be that shown in the Berry Pat. No. 3,689,921 which incorporated frequency counting means for display and unique signal validation means for determining when the measurement of the Doppler signal (speed of the target vehicle) was suitable for display. Radar units constructed in accordance with the teachings of the Fathauer Pat. No. 3,438,031 used a frequency counting means but incorporated a different signal validation system. In any event, the signal validation system must be one that will substantially eliminate false readings. If not, the radar's operations will not be judicially accepted, which is highly detrimental to its commercial success.

One of the improvements of the Berry radar over the Fathauer device was in the mulitple comparison scheme which allowed the radar to operate in a law-enforcement environment with an acceptably low rate of false or ghost readings. The Aker, et al U.S. Pat. No. 3,936,824 for moving radar expanded the art shown by the Berry radar from a stationary application to one in which the radar was operable from a moving police vehicle. The range of the early moving radar device was initially acceptable (although lower than an equivalent stationary type radar), primarily because radar detectors had not yet become a commonly used item in the motorist's possession.

In a moving radar device, the combined speed of closure makes the available time the target vehicle is within a displayable range relatively short compared with stationary radar devices. Therefore, it is highly desirable to increase the radar's range as much as possible, given the various design parameters of RF output power, radar detector sensitivity, signal to noise ratio, operation in a multiple target environment and operation with ghost free readings.

Some of the most recent radar devices, such as that disclosed in the co-pending Berry patent application, filed Oct. 18, 1977, and bearing Ser. No. 843,259, now abandoned, operate using a phase lock loop for determining the noise quality of the signal.

The subject disclosure has a unique signal processing scheme which enables it to operate with only a short burst of good signal on a distant vehicle or with a signal which is superimposed upon noise or multiple vehicle Doppler signals.

One of the characteristics of the Doppler signal, when a target vehicle begins to approach a range in which the signal can be detected, is that the signal begins to build up and then drop off and then build up to a higher amplitude and then drop off. All known previous art devices require that the signal be valid (whether using a phase lock loop, a counting process or a threshold detector) for a period of time sufficient for the Doppler counting system to complete a full cycle. For example, in X-band this is normally a 31 millisecond time interval to complete one count cycle corresponding to the time base interval, e.g., this allows a count of 60 to be entered into the digital counter if the target vehicle is moving with respect to the radar at a rate of 60 miles per hour. Accordingly, an approaching target vehicle has to close to a range where its detected Doppler signal consistently remains above this good threshold level for several time base intervals. Fading effects are generally caused by the noise and Fresnel effect (multipath cancellations of the microwave signal, primarily off the highway surface). The present invention allows the signal to be examined in short bursts and the array processing determines the validity of the short bursts that were sampled. For example, in searching for a valid signal, the present invention can make a determination on as few as 32 waveform cycles of the oncoming Doppler signal. Depending on which band (X or K) the radar is operating within, this may be a very short time interval. For example, at the X-band frequency of 10.525 gHz, a 100 mile an hour signal is typically 3140 cycles. This means that a 32 cycle sample requires only 1 1/100th of a second or roughly 10 milliseconds. At K-band, a 32 cycle sample would require only about 40% of this time or approximately 4 milliseconds of sampling. In the present invention, the time required to take a 32 cycle sample decreases as the frequency of the target Doppler increases. This is particularly beneficial in view of the fact that the flutter rate of the Fresnel cancellations also increase with closing speed.

Another aspect of this invention is the ability to turn the microwave radiation on and off by microprocessor control. When the signal is not being collected, but is rather being processed, the system has the capability of turning the RF off, thereby making it not detectable by radar detectors.

The Aker, et al. U.S. Pat. No. RE 29,401 teaches that a moving radar could be operated in an environment with the proper filtering means for separating the low Doppler or patrol car speed Doppler signal from that of the composite speed Doppler signal and then an arithmetic subtraction can be accomplished between the two measurements. The filtering scheme disclosed in the Aker, et al U.S. Pat. (RE 29,401) used several fixed filters which were tunable or selected over several fixed frequencies. However, these filters were discretely selectable in frequency and not continuously selectable. To maximize the effectiveness of the array processing scheme, it is necessary to accomplish good separation of Doppler signal (from low to high) so that one signal does not restrict the performance or the detection of the other. Since both Doppler signals co-exist in any moving radar environment, the unique filtering scheme disclosed in the present invention is continuously tunable as opposed to discretely tunable, thereby allowing the microprocessor to control or place the filtering frequencies anywhere over the expected Doppler range. As will be seen, the notch or null point of the high pass can be placed by the microprocessor exactly on the patrol car speed Doppler signal so as to null it out completely.

The implementation of tunable elements in the above-mentioned filters is actually accomplished by duty factor modulating of resistor values. Each resistor, which forms one of the characteristic poles of zero of the filter, is connected in series with a transmission gate. These transmission gates are CMOS, having a very low on resistance and offering suitable isolation while in the off state. The transmission gates to each filter are connected to a one shot multivibrator, which is triggered each time a frequency crossing of suitable polarity occurs on the control signal. Since the one shot triggers which constant pulse width duration, at a low control frequency, the output or on condition has a comparatively low ratio or duty factor with respect to the off condition. As the control frequency increases, the duty factor of the one shot output increases up to the maximum value of 1.0.

In the present invention, the master clock frequency (or repetition rate of the one shot) is 32 times the rate of the Doppler signal which is expected to be processed. This rate should be as high a multiple of signal frequency as possible, given the restrictions due to the delay constants of the transmission gates.

The output of a band pass filter and the output of a high pass filter each go to low pass networks which remove the capacitive spikes coupled through the transmission gates as they are turned on and off. This signal is then passed to a squaring amplifier which converts the signal into a high amplitude digital waveform. The output of each filter, now in digital form, can be selected for validation by a digital device based on nonamplitude characteristics. In other words, the amplitude is two-valued and the signal will be examined by the array processing for periodicity (having a periodic nature) and for noise contributions.

As will be seen, the master oscillator feeds the two one shots that control the frequencies of the band pass and the high pass filters. The high pass filter one shot can be driven from the master oscillator or from a slave VCO. The selection of master or slave is accomplished by the microprocessor depending on the desired frequency of operation of the filter network.

The subject invention is designed to operate in a way that allows the RF energy to be turned on or off under the control of the microporcessor. This enables the unit to operate in a radar detector avoidance mode.

In the moving mode of operation, the operator is given a remote control which he can place in his lap or on the seat beside him and which allows him to press the button and put the unit into the hold mode. In the hold mode of operation, the RF enerby turns off and the unit displays the last patrol car speed in the patrol window with flashing means of presentation and says "HLD" in the target vehicle window of the dispaly. Periodically, at random or pseudorandom intervals, the RF is turned on for a brief instant which allows the unit to verify that it is travelling at the same rate of speed that it was a few seconds ago. This allows it to maintain acquisition of the ground speed of the patrol vehicle so that when a target vehicle approaches to a point where the operator is sure that it is within range, the operator can then touch a button on the seat beside him and the radar will turn on the RF energy and within a few hundred milliseconds lock onto the target vehicle. The hold mode of operation allows the unit to maintain ground speed and not have to search for ground speed as an ordinary moving radar would have to be if it was merely turned off and then turned back on. In such a case, it is first necessary to acquire ground speed and then, after the necessary delay to accomplish this, the target speed could then be measured. This from the time RF energy first becomes apparent allows a person equipped with a radar detector time to slow his vehicle down before the radar can acquire its target.

Other and further objects of the invention, together with the features of novelty appurtenant thereto, will appear in the course of the following description of the drawings.

DETAILED DESCRIPTION OF THE DRAWINGS

In the accompanying drawings which form a part of the specification and are to be read in conjunction therewith, and in which like reference numerals are employed to indicate like parts in the various views:

FIG. 3a is the left hand portion of a wave form diagram showing the input signal, shift rate and binary pattern for Examples A, B and C with the example charts A and B indicating a Stationary Array with Noise and an Array with Negative Skew respectively;

FIG. 3b is a wave form diagram similar to FIG. 3a and with Example C, an Array with Positive Skew shown thereon along with the hit/roll table;

FIG. 3c is a figure orientation diagram showing the correct arrangement of FIG. 3a and FIG. 3b,;

FIG. 5 is a flow chart of the non-maskable interrupt routine called by the SSDA when initialized;

FIG. 6 is a chart showing the assembly language description of the SSDA initialization procedure;

FIG. 9d is an orientation diagram showing the correct orientation for FIGS. 9a, 9b, and 9c.

Figure 1:
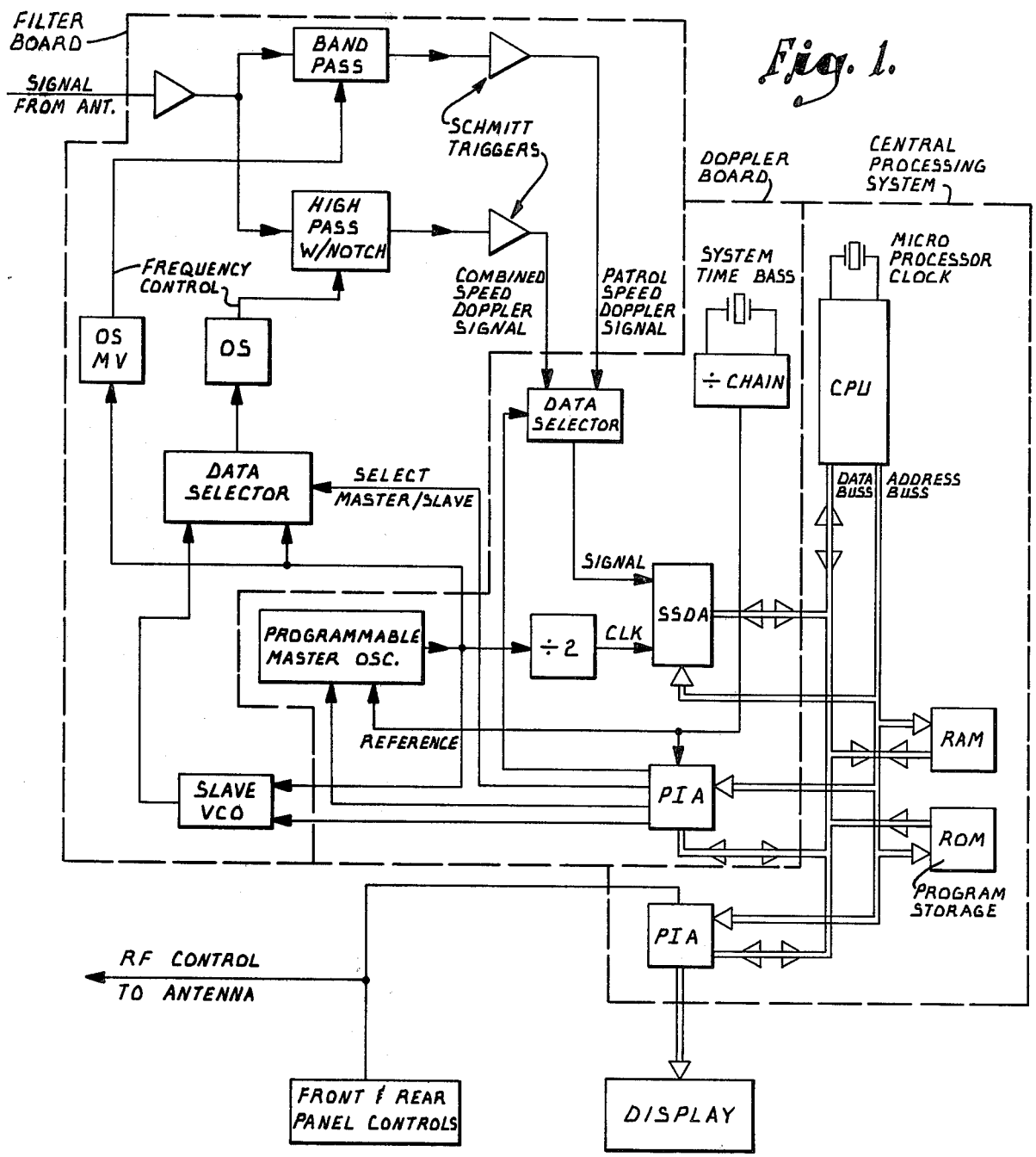
FIG. 1 is a diagrammatic representation generally illustrating the major functional blocks (and/or boards and the signal flow interrelationship there among of a preferred embodiment application of the traffic radar device.

Turning now more specifically to FIG. 1, the system is shown therein as being comprised of three major elements, a filter board, a Doppler board and a central processing system. The central processing unit (CPU) has under its control several peripheral devices including a 6852 SSDA device and a 6820 peripheral interface adaptor (PIA). A more complete description which shows the operational characteristics of these components can be seen in the *Motorola M6800 Microcomputer System Design Data*, No. 9701-11, published 1977 by the Motorola Company.

The SSDA basically is an integrated circuit which allows the reception of a serial data stream and interrupting the microprocessor for collection after certain number of serial bits have been received. The 6820 PIA is a programmable input/output device which is used to control the frequency of the programmable master oscillator among other things. Shown also on the central processing system are the components of the typical microprocessor signal system which includes a central processing unit (CPU), random access memory (RAM), read only memory (ROM) for program storage and execution of sequential instructions of the system. (See also FIGS. which show the CPU boards in detail). Another PIA is shown in the lower portion of FIG. 1 which is used to interface to the display, to the front panel controls and rear panel programmable input and output lines, and to the microwave source in the antenna assembly.

The Doppler signal comes from the antenna (typically from a homodyne detector) and has frequency components proportional to velocity of the target (and patrol) vehicle(s), as disclosed in the previously above mentioned patents. The signal is presented to the band pass and high pass filter systems and the frequency components selected by them are passed to Schmitt triggers which convert the signals to a digital form. These digital signals are presented to a data selector which allows the microprocessor via the 6820 PIA to select either the high or low Doppler signal as input to the SSDA for subsequent array processing.

The frequency of the high pass filter is selected and determined by the duty factor of its associated one shot. The frequency drive controlling the duty factor may be developed from either the programmable master oscillator or from the slave voltage controlled oscillator (VCO). The purpose of the slave VCO is to allow the high pass filter to be fixed at a particular frequency while the programmable master oscillator is programmed to some other frequency. Typically, once the ground speed of the patrol vehicle has been acquired and verified, the high pass filter is placed such that its notch or null frequency is identical with that of the patrol vehicle Doppler. To accomplish this, the system, after having acquired patrol car ground speed as will be discussed infra, programs the data selector so that the high pass filter is operating on master and the slave is allowed to track the master. After sufficient time for tracking has been allowed, the slave VCO is locked on frequency using a holding capacitor, the voltage on which determines the frequency of the VCO. Since this capacitor is now isolated from error correction circuitry, the VCO is forced to stay at the last frequency which it was able to acquire. This then will leave the high pass filter tuned so that the null response characteristic thereof corresponds to the low Doppler frequency, thus eliminating the patrol speed Doppler frequency component from the resultant filter output signal.

Figure 8A:
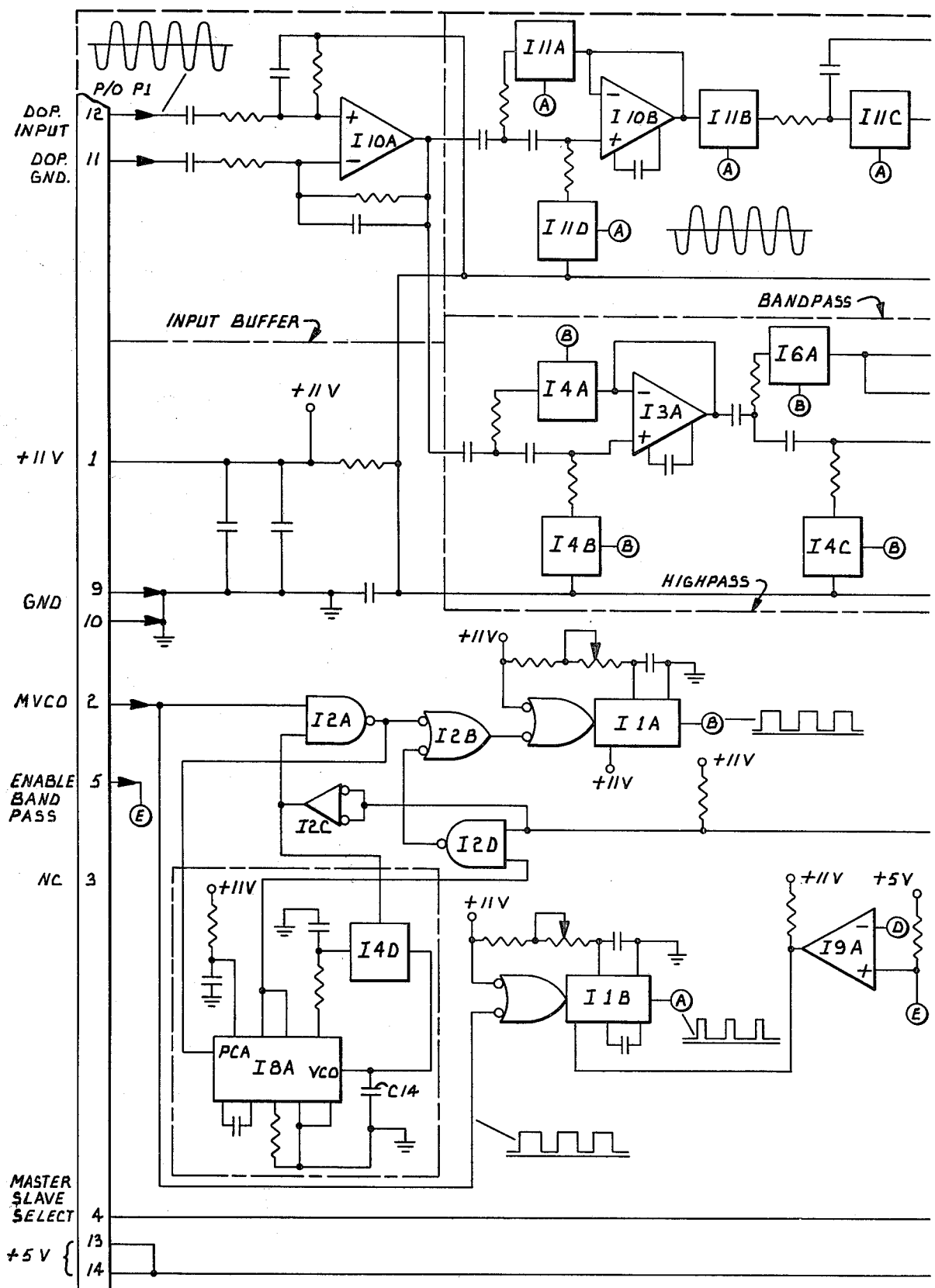
FIG. 8a is a left hand portion of a schematic diagram of the filter board.
Figure 8B:
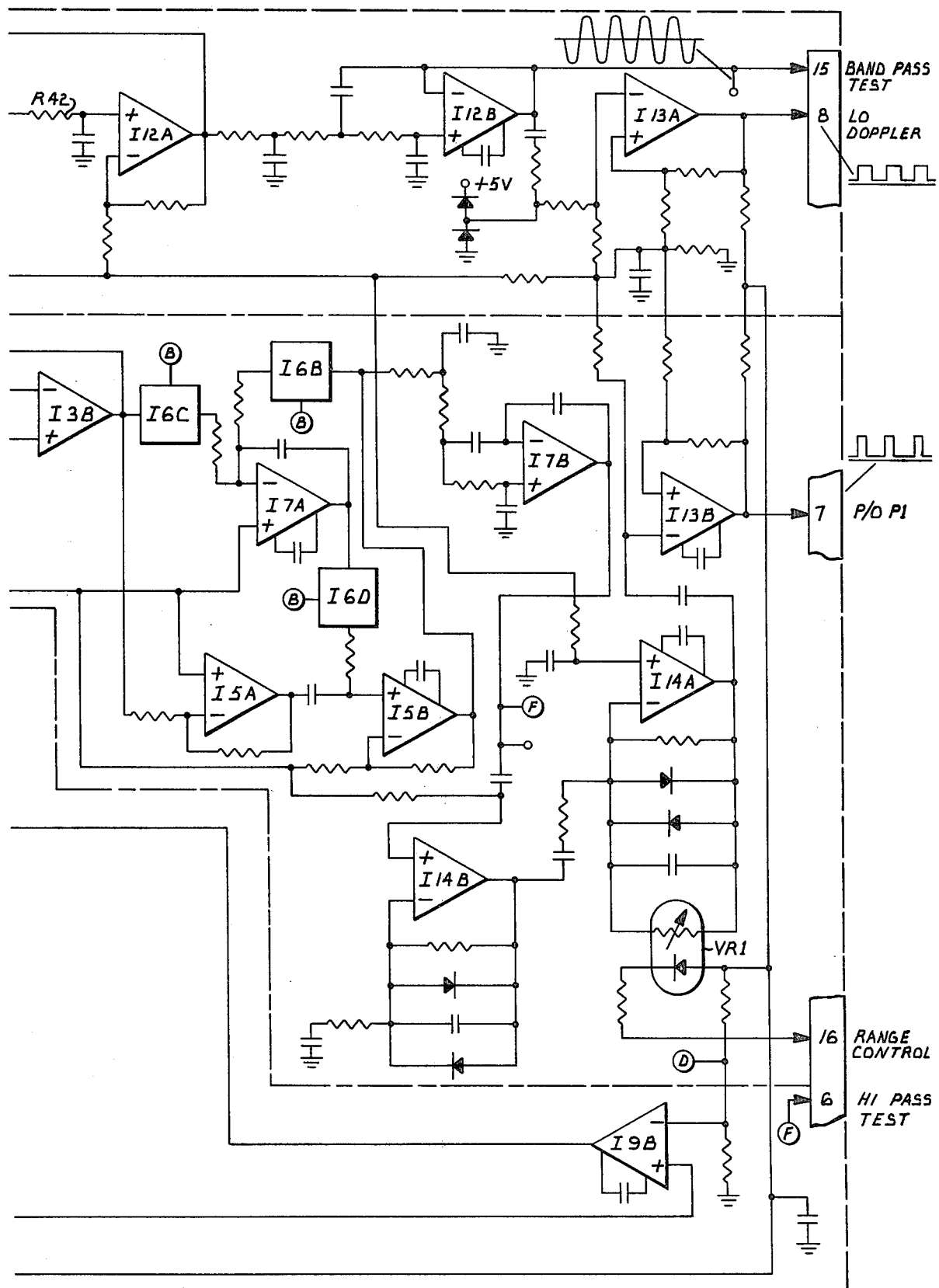
FIG. 8b is a right hand portion of a schematic diagram of the filter board.
Figure 9A:
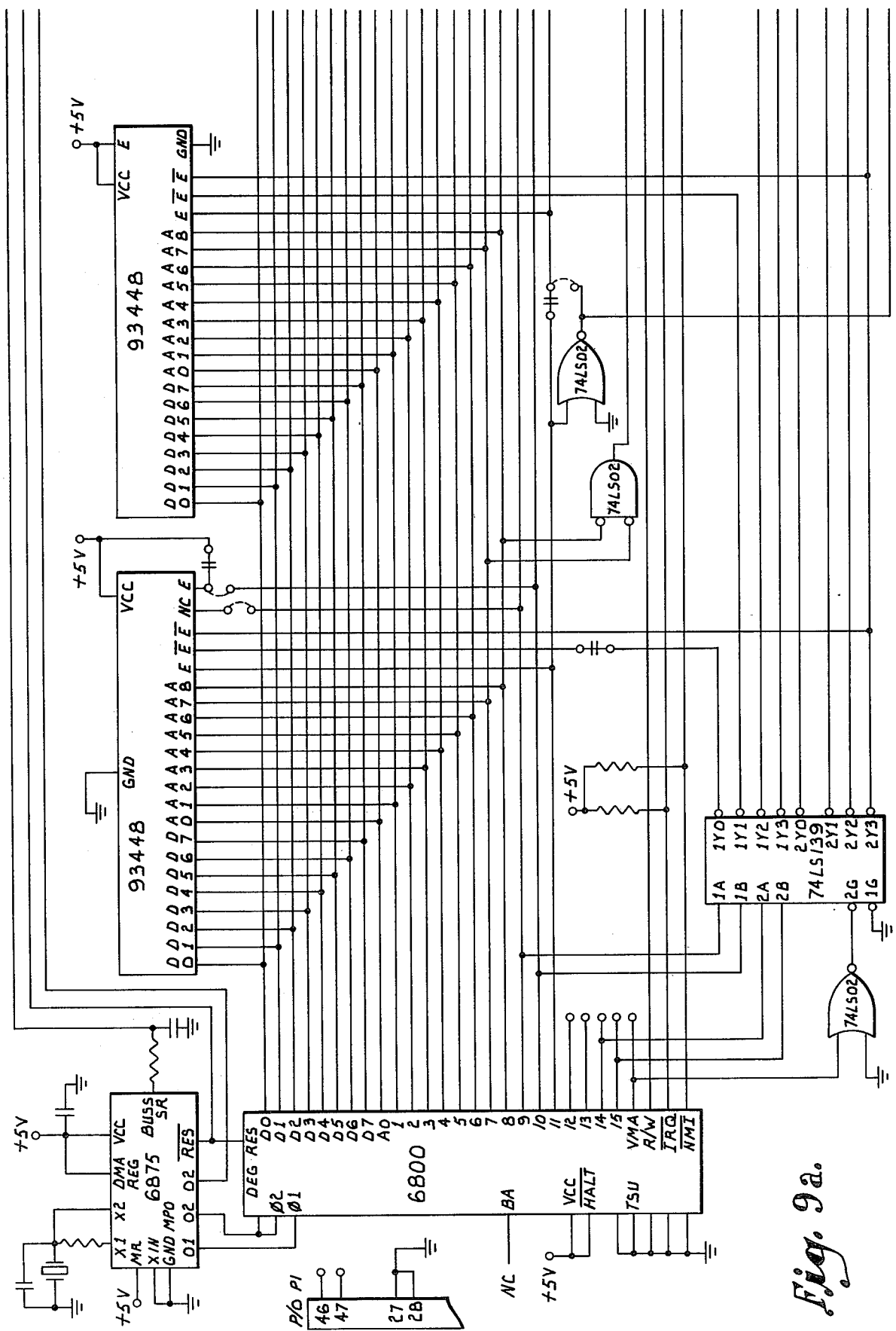
FIG. 9a is the left hand portion of a schematic diagram of the CPU board.
Figure 9B:
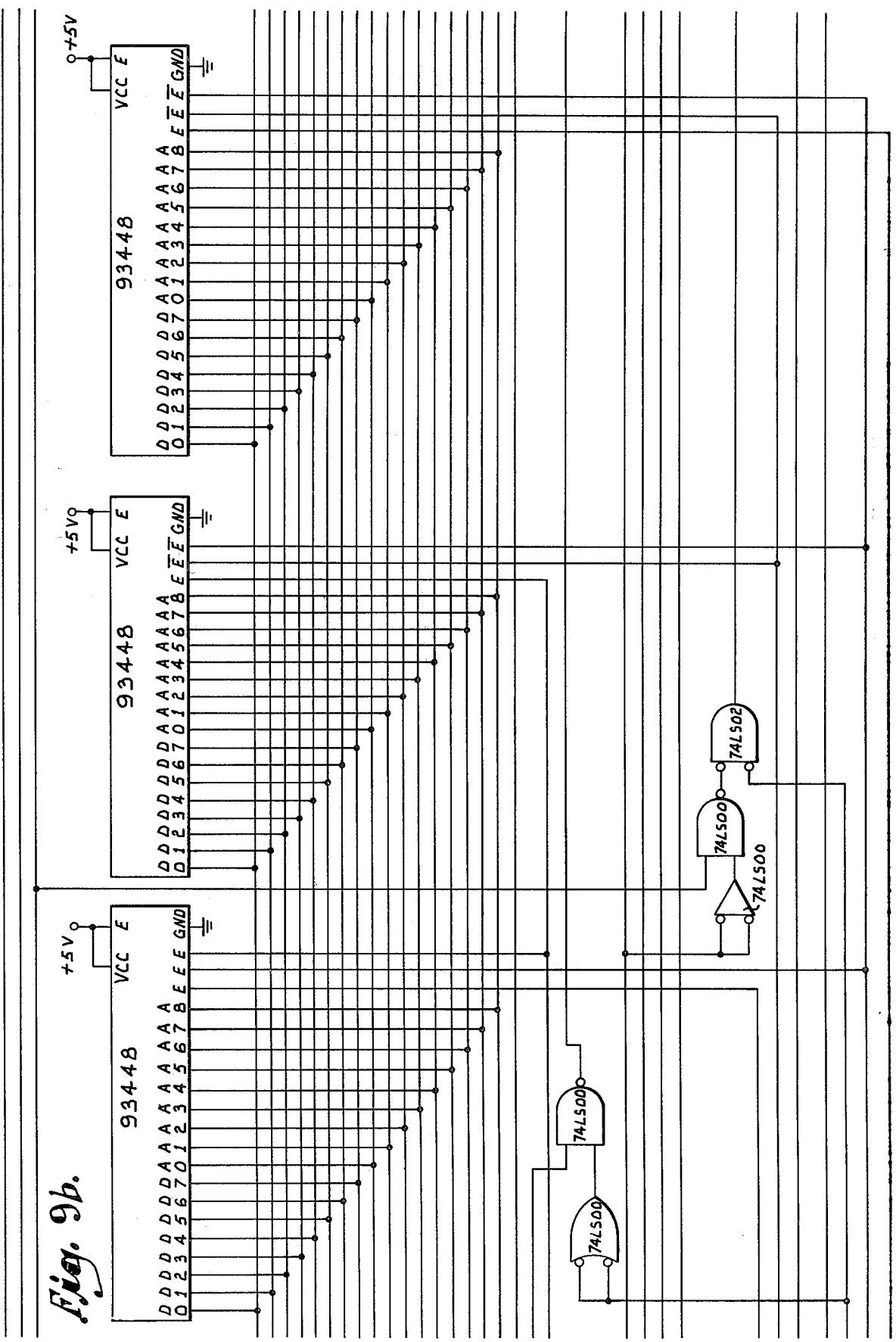
FIG. 9b is the central portion of a schematic diagram of the CPU board.
Figure 9C:
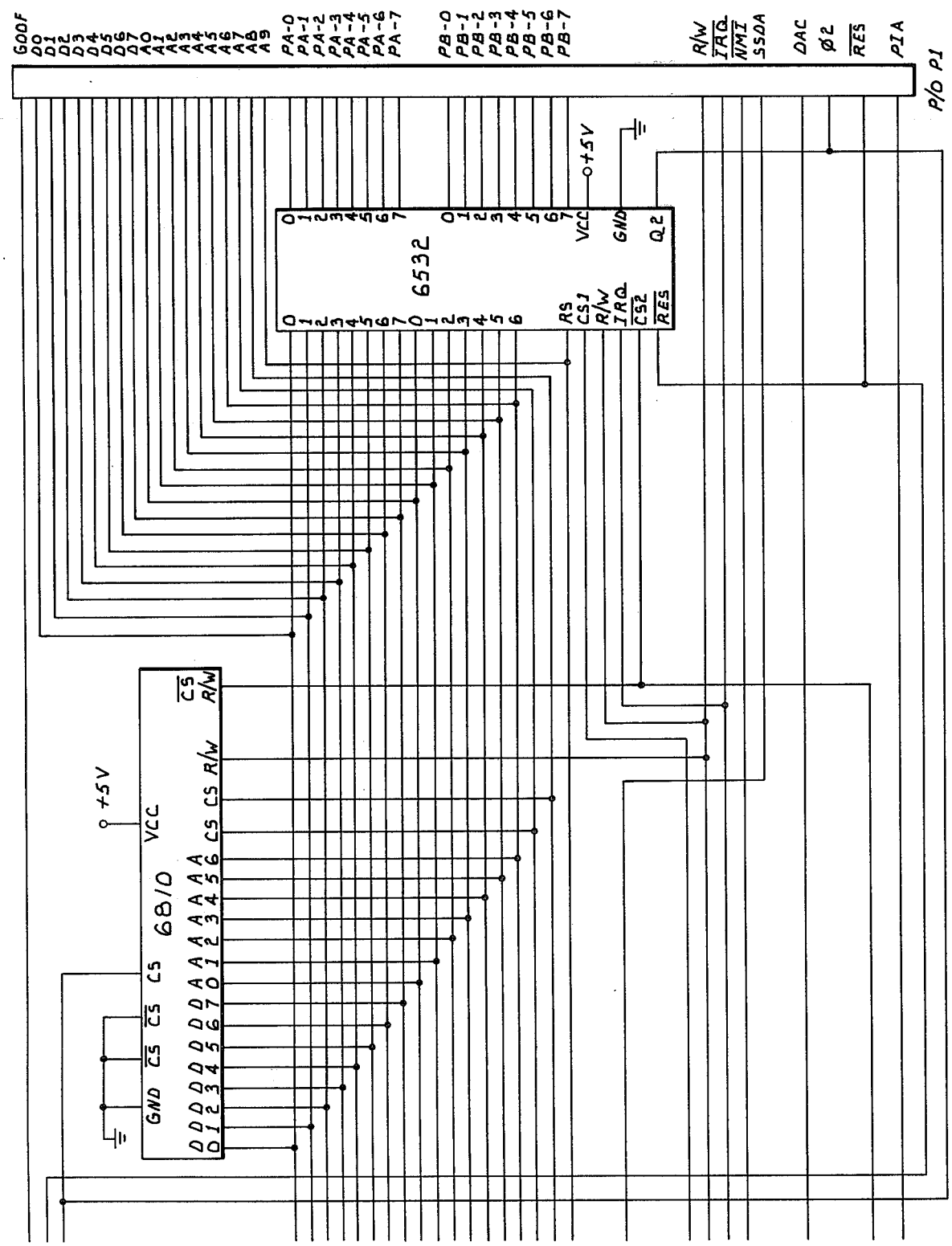
FIG. 9c is the right hand portion of a schematic diagram of the CPU board.

The filter board as shown in FIGS. 8a and 8b composite incoming Doppler signal from the antenna is directed into I-10A, a differential amplifier and is applied to two filter networks. The first filter network is a band pass filter network comprising I-10B, I-12A and I-12B. The second filter network is a high pass filter network having a notch in its stop band and is comprised of I-3A, I-3B, I-7A, I-5A, I-5B and I-7B. This filter is followed by amplifiers I-14B and I-14A.

The band pass network is a two pole high pass followed by a two pole low pass with the center frequency of this filter being determined by the duty factor of the output of the one shot I-1B. As was mentioned earlier, the average value of a resistor forming a pole or zero of the filter network is determined by the duty factor of the transmission gate that is connected in series with the resistor. For example, if the transmission gate I-11C, which is connected in a series with R-42, is on 25% of the time and off 75% of the time, R-42 will have a time-average effective resistance of 4 times its normal value. In other words, its RC time constants will be multiplied by the duty factor of the transmission gate. In this fashion the values of all resistors may be assumed to track and be controlled by the duty factor of the controlling one shot.

The high pass filter network consists of two stages of two pole high pass filters followed by a notch filter. The operation of the notch is discussed in literature under the title "Active Filter Has Stable Notch and Response Can Be Regulated" by J. R. Bainter, *Electronics*, Oct. 2, 1975. The frequency of the network pass band is controlled by the duty factor of the one shot I-1A and is tunable over the range of interest (15 to 180 mph) of desired Doppler signals. The output of the high pass filter is applied to amplifier I-14B which is a limiting amplifier whose gain is controlled by the current through VR-1.

VR-1 is a variable resistance OPTO coupler and the current through the photo diode, as determined by the setting of the range control on the front panel of the unit, controls the gain of this stage. The output of I-14A goes into comparator I-13B, where it is converted into a two-valued digital waveform. This is a Schmitt trigger type circuit and forms the output of the high Doppler digital signal. I-8A is a 4046 phase lock loop and is shown in the block diagram of FIG. 1 as a slave VCO.

The output of the master VCO is applied through I-2A to the PCA input of I-8A. I-4D is a transmission gate in series with the phase detector output and the VCO frequency control input of the 4046. When I-4D is closed, it allows the VCO input to track the master VCO by adjusting the charge on C-14. When the path from the phase detector to the VCO input is opened, I-4D is in the off condition and C-14 holds a voltage corresponding to the last locked frequency that the VCO acquired, thus forcing it to remain at that previous frequency.

The purpose of this slave VCO is to allow the high pass filter to remain at a particular frequency setting while the master VCO is occupied with loading the SSDA device at a shift rate which is independent of the filter frequency setting.

The master/slave VCO operation is enabled by a signal into comparator I-9B which selects either master or slave as the input to I-1A one shot. The input of I-2D and the input of I-2C both come from the output of I-9B. If I-9B output is low the selection is master and the I-2D gate is in the high condition. The output of I-2C is in the high condition closing, or making operational, the transmission gate I-4D and allowing the slave VCO to track the master. Under this circumstances I-2A is also active and passes the master VCO through to the input of I-2B, triggering I-1A.

In the operation of the system, the radar does a periodic verification of its own speed based on time delays built into the executive program routine. When it does this verification, it slews the master VCO to the frequency corresponding to the previous ground speed reading, waits a period of time for the master VCO to lock, then it selects master for the master/slave select line. The slave VCO then tracks the master, refreshes any charge that might have leaked off C-14 and after a verification has been accomplished, the master/slave select is switched back to the slave state, the transmission gate is opened and I-1A is again triggered off the output of the I-8A VCO through I-2D and I-2V and continues to be triggered by the slave VCO from that point.

I-9A is used to disable or enable the band pass one shot primarily due to a discovered improvement in the operation of the unit if the noise contribution from this circuitry is eliminated when it is not in use.

Figure 2A:
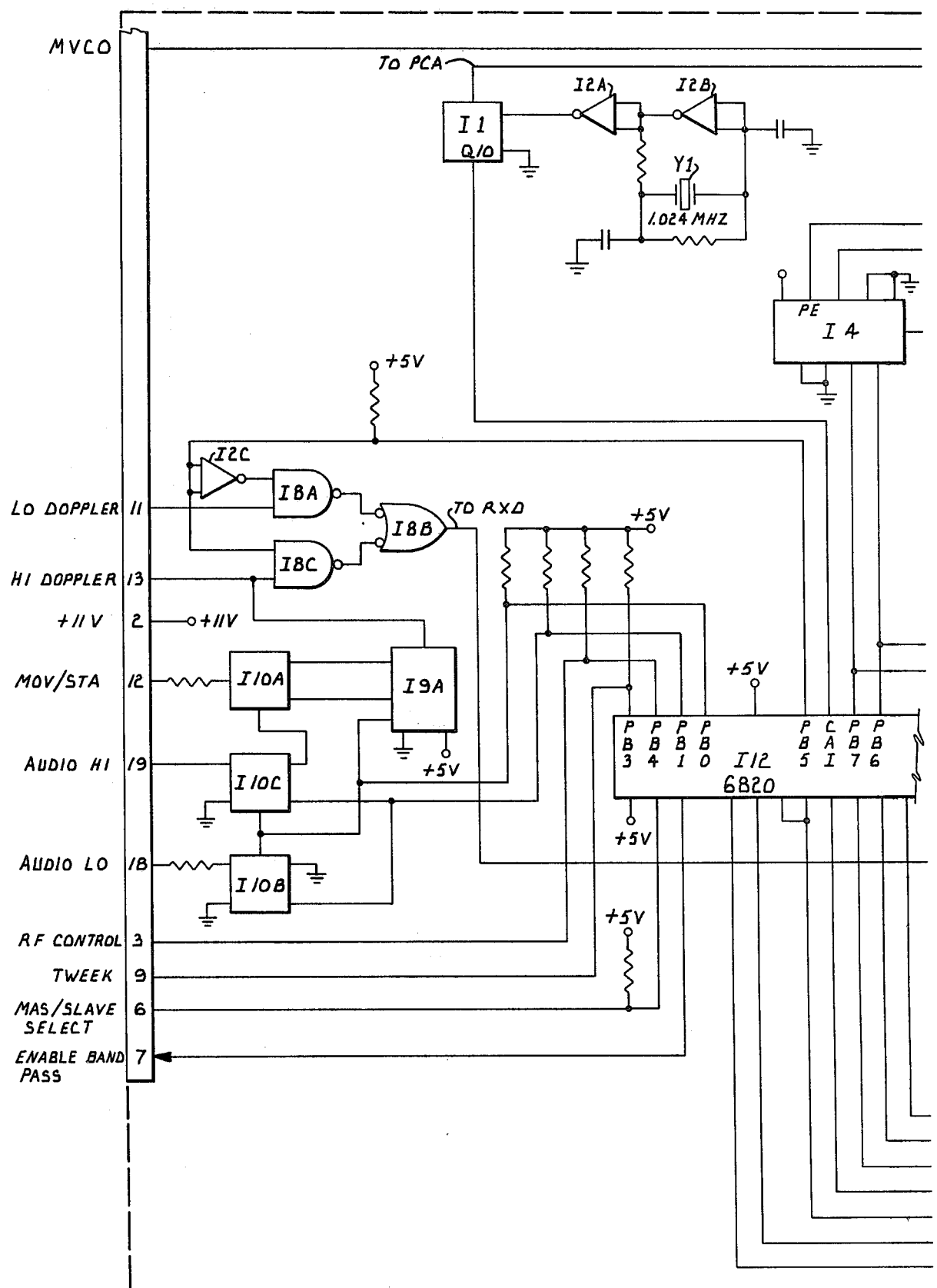
FIG. 2a is the left hand portion of the schematic diagram of the doppler board.
Figure 2B:
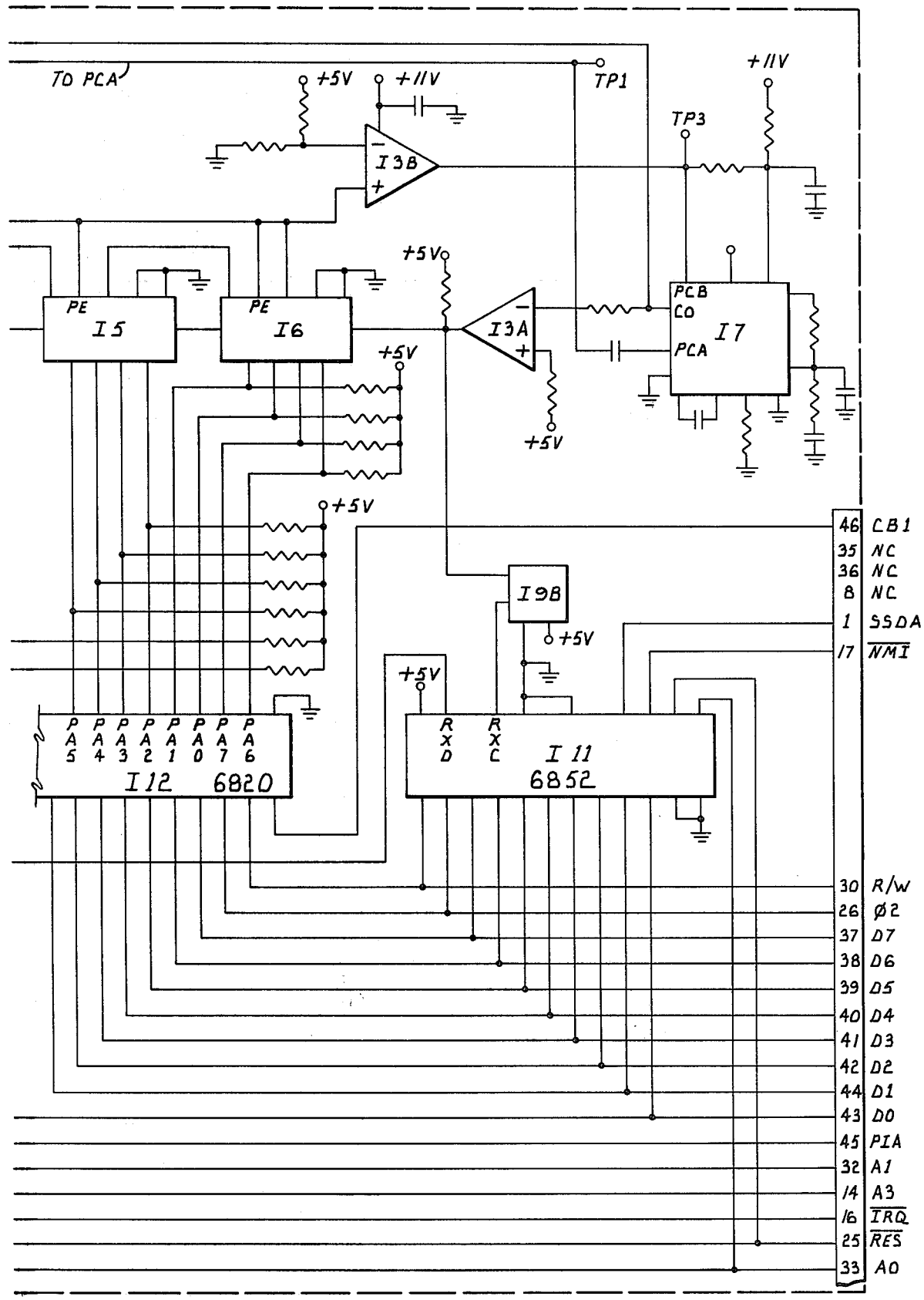
FIG. 2b is the right hand portion of the schematic diagram of the doppler board.

Turning now more particularly to the Doppler board, the circuitry for bringing the data into the microprocessor memory is shown in FIGS. 2A and 2B. The array processing operation which is performed after the data is brought into memory will be described in more detail in the specification.

The Doppler board primary components are the PIA, I-12, which is a 6820 input/output interface and I-11, a 6852 synchronous serial data adapter. Both of these components are connected to the microprocessor system data bus indicated as lines D-0 through D-7. These components are also connected to the read/write (R/W) line and have certain address selection lines such as A-0, reset line $\overline{RES}$ and the SSDA line which is used in address decoding to select I-11 for transmission or reception of data onto the data bus. The PIA line is used for address selection on I-12. The microprocessor system decodes the addresses that call for the operation of these devices. The are capable of either reading data from the data bus or writing data onto the data bus as determined by the read/write line, R/W.

The protocol for the data bus, the address bus, the phase 2 line and the read/write line may be found in the M6800 Microcomputer System Design Data previously reference and is a standard protocol for these types of microprocessor components.

The PIA I-12 has a number of lines that can be either used as outputs or inputs and has four registers that define either the data or the data direction.

I-12 is a device which is used to bring a serial data string into the microprocessor bus and may by programmed to recognize a certain data pattern (sync word) before it generates an interrupt. The line marked $\overline{NMI}$ is a line to the microprocessor itself which generates a non-maskable interrupt call. For example, the 6800 microprocessor has two types of interrupt flags, one called the NMI or non-maskable interrupt and another designated IRQ which is the maskable or programmable interrupt call. The operation of these interrupt lines is such that the microprocessor can be operating in some area of its program and, when a logic transition occurs, it alerts the microprocessor that it needs to interrupt its present task and go service the calling device. The microprocessor hardware is equipped with the appropriate routine for stacking the program counter location, accumulator values and processor status flags on an interrupt stack and then servicing the peripheral device that is called according to the software procedure reached by the interrupt call.

When the interrupt occurs, the processor goes to a predefined address vector from which it receives instructions as to where to begin the program execution for that interrupt call. After completing the interrupt call, the processor restores the program counter to its state prior to interrupt and proceeds on the algorithm it was executing at the time just prior to the interruption.

The microprocessor clock is independent from the system time base, both of which in the present invention are crystal controlled. One of the features of this invention is the ability to check its calibration automatically by compring one time base against the other. Prior to locking up a violation reading for permanent display, the microprocessor calls a program which counts the number of cycles around a program loop between IRQ interrupts. Since the processor cycle rate (and the number of instructions per second around the program loop) is determined by the microprocessor clock and the IRQ rate of occurrence is determined by the system time base (discussed infra), the number in the counter will not be its calculated value if either are in error. If this is found to occur, the unit will display "CAL ERR" instead of a violation speed.

The system time base is shown in FIG. 2A as Y-1. Y-1 is incorporated in an oscillator circuit operating a 1.024 MHz, the output of which is divided down with the divided output Q-10 being connected to the CA-1 line of I-12. I-12 is programmed when the system is initialized by the initialization routine thereby defining CA-1 as an edge triggered interrupt line. Each time CA-1 makes a transition in the appropriate polarity, I-12 will cause the $\overline{IRQ}$ line (FIGS. 2A and 2B) to transition to the low state thus notifying the microprocessor that a standard duration time interval has elapsed. The microprocessor will then service this interrupt which has priority over all tasks except the NMI interrupt. The processor reacts to the IRQ routine and services timer flags, refreshes the display and reads in any keyboard switches and input contacts for the purpose of "debouncing" and determining whether these switches have changed their states. The processor then returns to the location in the program it had reached prior to interrupt. This interrupt occurs 1 millisecond and is the master clock for the system.

I-7 (a 4046 phase lock loop), I-3A, a comparator and I-4, I-5 and I-6 a 14526 programmable divider, form a stabilizer master oscillator circuit whose output frequency is an integer multiple of the reference frequency. The reference frequency is supplied from I-1 (a 4046 divider) to the phase comparator PCA input. The output of the phase lock loop oscillator comes out on line C-0 and connects to the input I-6 (through I-3A), same being cascaded with I-5 and I-4. When these counters have been counted down to zero the PE line will all make a simultaneous transition and the counters will automatically reset (See *Semiconductor Data Library*, Volume 5/Series B, pp 5-312, Motorola, Inc., 1976). The reset pulse is connected to the phase lock loop at PCB (through I-3B) and the phase comparator circuit within I-7 (a 4046) will act to bring the signals on PCA and PCB to phase and frequency lock.

When phase and frequency lock is accomplished, the output of I-7 will be an integer multiple of the output of I-1 since the division ratio of the chain is controlled by the lines PA-0 through PA-7 and PB-6 and PB-7 of I-12.

The frequency of the VCO will be controlled by the output of I-12, same having 1024 discrete steps. These are set up by the system design so that one least significant step of I-12 will change the frequency of the VCO by 500 HZ, thus the output of the VCO which is (denoted here as the master VCO) changeable in output frequency by 500 Hz increments ot a maximum frequency of 1023×500 Hz, or slightly over ½ MHz. The output of the VCO is applied through I-9B (a 4520 divider chain) and only divided by 2 and applied to the clock input of I-11 (the 6852). I-11 is designed so that a clock frequency will shift in one bit of the input signal each clock cycle. If I-11 is operating and is accepting data, it will shift in 1 bit of information through the RXD line. One of the objectives is to make the VCO be high in frequency compared to the signal frequency considering the operational characteristics of the devices involved, as was discussed under the filter board discussion and involves the method of operation of a tunable filter thereon.

The data input line of I-11 (the RXD line) comes from the output of I-8B (a 4011 Nand-gate). I-8A, I-8B and I-8C in conjunction with I-12C are used as a data selector with the data selected for input to I-11 (FIG. 2B). Therefore, the selection of either high or low Doppler signals is accomplished by the state of PB-5 line on I-12. With I-12 being programmed by the central processor unit (CPU) to interrupt same under certain conditions, i.e, the I-11 is initialized by the CPU unit to wait until it sees a certain data pattern. When that data pattern occurs, it is allowed to shift in data at the rate determined by the receive clock (RXC). It will shift in a continuous data string 8 bits at a time until it has been turned off by the central processing unit (CPU). I-11, when used in this manner is programmed to shift in 16 bits, which it arranges as two 8 bit bytes, and has a three byte buffer such that two of the buffers can be full while data is being shifted into the third. Once the I-11 has accumulated two bytes of information, it pulls the NMI line low which causes a non-maskable interrupt having priority over all central processor (CPU) activites. The central processor unit then stacks its work in process, services I-11 by reading the two data words that I-11 has gathered, and in so doing clears the SSDA output buffers, resets its interrupt flag and then returns to whatever task the CPU was in the process of performing prior to interrupt. The purpose of this process is to accumulate the input signal in a digital time information form as a digital word so that it can be processed within an array as mentioned earlier.

Finally, other outputs of I-12 include PB-0, PB-1, PB-3 and PB-4 which are used to control the audio, select certain functions on the filter board, trigger the watchdog circuit (if the watchdog is not periodically triggered, the system has halted or is not operating properly and the watchdog causes a system restart), and to select either high or prescaled Doppler information so that it might be of a more pleasant musical tone to the ears. One of the problems of K-band radar is that the audio is of too high a frequency to be comfortable to the listener and is prescaled by a factor of 4 in moving mode and by a factor of 2 in the stationary mode. This is accomplished by the I-9A divider and the selection gates I-10B and I-10C.

Turning now more particularly to FIGS. 3a and 3b, the principle of array processing as shown therein relates to a procedure for translating an incoming Doppler signal into a binary form and arraying it within an area of storage so that a predetermined algorithm can operate on the array and determine the acceptability (validity) of the input signal, both with respect to signal noise and to frequency.

FIGS. 3a and 3b illustrate several examples of array processing as implemented in the disclosed invention. The input signal is shown as a two valued or binary signal representative of zero crossing information. This information is usually derived after the Doppler signal has been appropriately filtered and squared through the Schmitt trigger or other squaring means. This binary signal is applied to the Doppler board, discussed above, which translates it into a serial bit stream, same being shown immediately below the input signal wave form in FIGS. 3a and 3b. As was previously disclosed, this serial bit stream is gathered by a 6852 SSDA device which is designed to be a peripheral in a microprocessor application. However, other means for accomplished the same function might be employed such as a shift register and other hardware means for processing the array. Accordingly, the array processing scheme is not limited to utilization by a microprocessor.

The shift register device or SSDA device shifts in the state of the input signal at each shift clock interval. In the specific example shown in FIGS. 3a and 3b, an interval is arbitrarily defined as an 8 shift clock interval because of the 8 bit organization of the microprocessor used in the application. This could be some other arbitrary interger number, such as 16, depending on the microprocessor or the specific hardware implementation of the process. The examples indicated the acquisition of 16 intervals of input signal. The input shift rate was determined by a programmable master VCO which drives the clock input of the SSDA. The programmed frequency of the VCO in this manner controls the input shift rate.

Example A (FIG. 3a) shows an input signal which is approximately 1/16th of the input shift clock frequency and which has produced a stationary array. The definition of stationary as opposed to skewed array will be discussed infra.

As the input signal arrives and the shift clock changes state in the appropriate polarity, the input signal will either shift in as a one or a zero, thus comprising a serial data stream of binary ones and zeros shown immediately below the input signal wave form. The SSDA is designed to be able to generate a processor interrupt on receiving a specific 8 bit pattern (sync code).

In the present invention, the SSDA is initialized so that it will detect the input bit pattern 1111 followed by 0000, which in hexidecimal notation is an F0. When F0 is detected, the SSDA, after having been properly initialized by a software process, accepts 16 input shifts forming two 8 bit characters (bytes) and then interrupts the processor while it accepts a third 8 bit character. It is a requirement of the system that the SSDA be serviced and its stored two characters be removed from its three character memory buffer prior to a third memory buffer becoming full. This requirement means that the servicing of the SSDA must take priority over all microprocessor tasks, as the input signal will not wait for the microprocessor to become available.

The NMI routine is flow charted in FIG. 5 and will be explained, infra. The purpose of the routine is to take the necessary number of array samples in order to generate an array of the appropriate length and then to terminate operation leaving an array of memory which can be operated on by the array processing algorithm. In FIGS. 3a and 3b three arrays are shown. The system complements ever other 8 bit byte in order that the 180° phase difference of the input wave form in the time intervals will be shown as similar information. The complemented intervals are indicated by the number with the line over same, such as $\overline{2}, \overline{4}, \overline{6}$, etc.

There are 256 total combinations of binary patterns available in an 8-bit byte. The algorithm disclosed here uses only 16 of these combinations. These combinations are shown in the hit/roll table, FIG. 3b. The hexidecimal equivalent for the binary array is shown adjacent to the binary array, i.e., a 11110000 is notated as F0 in hexidecimal notation.

In Example A, the serial pattern as arrayed by the NMI routine is shown as a stationary array. Several noise pulses are also shown which disturb the normal periodicity of a noise free input signal. These noise pulses produce numerical values within the array that are not found in a comparison of the hit table and therefore counted as a miss. As will be shown, the presence of a few noise pulses within the array does not invalidate the input signal and prevent it from being used by the radar device, as is necessitated by known prior art devices. In Example A, the input signal on a 16 byte array shows a hit of 13 and a roll of zero. This then means the microprocessor has found a ratio of 13/16th of good signal and that the array was stationary, thusly informing the microprocessor that the frequency of the shift clock was 16 times that of the input frequency. Since the shift clock is a function of the command number programmed into the master oscillator, the microprocessor may then compute the frequency of the input signal. This frequency is multiplied by a conversion factor appropriate for the desired unit of measure. The microprocessor tests a P/A input line for a ground condition (jumper wire) to display in miles per hour, kilometers per hour, or other units.

Example B shows an input signal which is greater than 1/16 of the shift rate. Stated another way, the input signal is fast and the VFO frequency will have to be increased if a stationary array is to be generated. The array will have a skew as is shown in Example B. Here the algorithm will detect a hit within the table and it will find successively increasing values within the table as it seeks to compare a value within the table of valid hits against the binary character in the array. For explanatory purposes, a hit is defined as a comparison between a character in the array and a character within the table that is within the reach of the algorithm. The algorithm, as will be shown in the flow chart, FIG. 4, permits the comparison of a character within the table 3 positions both in the plus and minus direction from the previous comparison. Each time a comparison is found within this range, the system will increment or decrement a roll counter and move its index position around the table pointing at the position within the table where the last comparison was found.

In Example B, as the algorithm compares between the array character and the table character, it will decrement the roll counter to point at each new character found that was a hit. On exiting the array in Example B, the hit counter will show a total of 15 out of 16 hits and the roll counter will show the number negative 15. Knowing the frequency of the VFO that causes this serial bit pattern, the microprocessor is able to compute the frequency of the VFO that would have produced a stationary array under the same input signal condition. However, it is not necessary to "lock to" the input signal with a stationary array in order to measure its frequency.

Example C is similar in some respects; however, in this example the input signal is a slow signal, i.e., its frequency is less than 1/16th of the shift rate. As can be seen, the period of the input signal is slightly greater than two shift intervals. In Example C, the array rotates or skews in the opposite direction and the algorithm will determine that this is a valid array with 16 out of 16 hits having a roll of plus 18 units. A unit of roll in this system typically represents a frequency difference corresponding to a fraction of one mille per hour in speed.

A representation of the array as shown in Examples A, B and C show some rather definite visual patterns. For example, the stationary array, Example A, shows a preponderance of ones on the left side of the array and a majority of zeros on the right side of the array. Example B, where the input signal is high, has arbitrarily been defined as negative skew, and shows a stripe of zeros running through the array starting at the right and ending at the lower left. Example C twists in the opposite direction and for large amounts of skew looks like a barber pole (viewed from the side). A signal with a high degree of noise content shows no such pattern but will have ones and zeros apparently randomly distributed through the array as will an array where there is a large difference between 16 times the input signal and the shift rate. Such patterns will have very low hit ratios and will be rejected by the microprocessor as being invalid.

Figure 4:
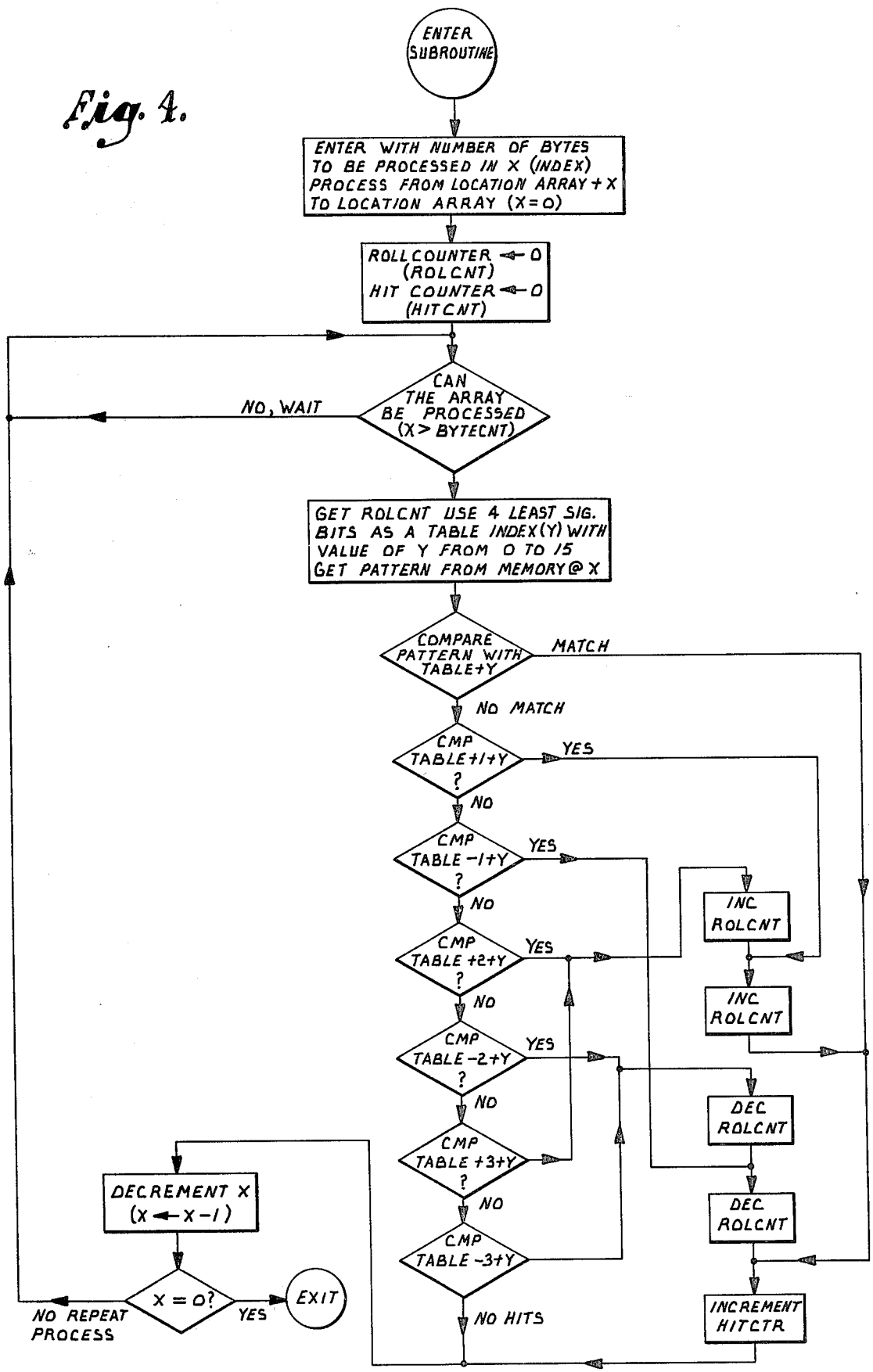
FIG. 4 is a process array subroutine (PROARY) executed by the CPU of the preferred embodiment of the invention.

FIG. 4 is the flow chart for the array processing subroutine. This subroutine is incorporated within other major programs and may be called from programs which are trying to determine the validity of either patrol car speed or combined speed. The subroutine is entered or called with the number of bytes to be processed by it in the X index register. The system is designed so that the NMI routine will always place the array to be processed within a specific area of the memory. The array processing will operate with respect to this area of memory and process the number of bytes, as previously mentioned, between the start of this location and X (or the valude in X). (Stated another way, the memory between the bottom of the array and the array plus X will be processed by this subroutine). On entering the subroutine, the roll counter and bit counter will be initialized to zero and prior to each examination or comparison of patterns within memory, the value of X will be compared to that in the counter called BYTCNT. This is a counter used by the NMI routine and insures that the array processing will not get ahead of the actual deposition of the new array by the NMI routine since these two can operate independently and concurrently. BYTCNT decrements down to zero when the NMI routine has completed building the array and this system design will allow the microprocessor to start processing the array as soon as the first data bytes have been gathered by the NMI routine rather than just waiting until the array is completed before starting the processing. At any rate, if the array is not yet processable, the first decision block causes a wait of the process until BYTCNT has decremented below X. The next step is to get the roll counter, which is an 8-bit number, and use it as an index to the hit table. In order to accomplish this, only the least significant four bits of the roll counter are used as an index. In other words, for example, if roll count is incremented past the number 15 (OF) to 16, the data within it in hexadecimal notation would be 10 or binary 00010000. The least significant four bytes of this counter would be zero, which would place the roll counter at the same point on the table it would be if it had a count of zero. The roll counter then forms a counter which rolls around the table as many as 8 rotations in either direction. The two directions are arbitrarily defined as plus and minus, depending on what type of skew is being processed. Following this index operation, the pattern for memory to be examined is taken out of a location array plus X as previously discussed. This pattern is compared against the pattern at the table base address plus the index Y. Y as was discussed, is a number which may have a range from zero to 15. The memory pattern is compared with the character in a table at the base address. If a match is found as shown in the first decision block, this is a hit and causes a hit counter to increase in value by one. Following this the value of X is decremented or decreased by one and again compared with a value zero. If X is not decremented to zero, the algorithm is not completed and the program branches back to check whether a further byte can be processed or not. If a match is not found at the base table address, the processor then compares the memory byte with the value in the table 1 above the base (1 in the positive direction).

The system first searches for a comparison (match) at the base value plus the index value within the table. If no match is found at this table location it then successively compares one above it and one below it, two above, two below it, three above it, three below it, and if no comparison or match is found in the seven comparisons, this is defined as a miss and the algorithm decrements X without incrementing the hit counter. It can be noted that following a change of the roll counter, on the next loop through the program the pattern to be compared on the first comparison will point at a position within the table which corresponds to a previous match. An exception to this occurs on a difference of plus or minus three. It was experimentally determined that under certain circumstances when two targets were within the radar beam, a high degree of intermodulation was possible and that it was undesirable to allow the algorithm to move further than two roll counts during any one comparison cycle. It can be seen that if a comparison was found that was either three above or three below the base value, the roll counter is only incremented or decremented twice.

The process continues around the loop until X memory bytes have been compared for hits within a table, at which time the subroutine will exit with a value in the hit counter that is indicative of signal goodness and a value in the roll counter which may be either positive or negative, indicative of skew or of difference between the input signal and 1/16th of the shift rate.

FIG. 5 is a flow chart for the NMI routine which loads the array in the memory. This routine is called by the SSDA as previously discussed. The assembly code for the SSDA initialization is shown in FIG. 6 and reference to this and the manufacturer's literature listed below will enable an understanding of how this unit is initialized in order to operate in this system. After the initialization, the SSDA will generate an interrupt when a OF (Hex Notation) bit pattern is detected in its sync code register. The sync can be preloaded and is a hardware feature of this particular device as it is normally used in a communication system to detect start-of test (STX) or other characters. In this case it is used to detect the transition of the input signal from zero to one and when this to occurs in the center of the first 8 bit window or time interval.

Referring to FIG. 5, when the sync code is detected by the SSDA it will accept 16 bits of serial information without regard to the content of that information as it has been programmed for a one byte sync character mode. The SSDA has, as previously mentioned, three registers to accumulate these characters or bytes, and having accumulated two, will cause an interrupt. The microprocessor interrupt structure causes the microprocessor to save its currently operating program counter, processor status, index register and accumulators by pushing them on a stack. The interrupt then gets the index register value that it is going to operate with from a byte counter designated as BYTCNT and, as will be shown in FIG. 7, BYTCNT is an input to the PROARY subroutine as to how many bytes of signal the array will include. The byte count number tells the interrupt structure where it is within the array gathering process and when it has counted BYTCNT down to zero, the NMI routine will disable the SSDA from creation of further interrupts. The first byte from the SSDA is loaded at the array plus the X value memory location. This is shown in the third block of FIG. 5 as array $-1+X$. This means that this is an indexed instruction and that the memory locations' storage point will be determined by X. The second byte from the SSDA is complimented and stored at the next successively lower memory location. X is then decremented by two, representative of the two bytes of information that have been loaded into the memory. X is then compared with zero. If X is not zero the disabling block is bi-passed. If X is zero, the array process is finished and the interrupt enable of the SSDA device is disabled under program control.

At this point the SSDA will stop interrupting the processor and must be initialized by going through the initialization routine shown in FIG. 6 prior to its being able to interrupt the processor further. The value of X is saved in BYTCNT, which results in BYTCNT having a value of two less than it had upon entry. The old accumulator values, index register value, processor status and program counter are restored and the system returns to the program that it was running just prior to the NMI interrupt.

Figure 7:
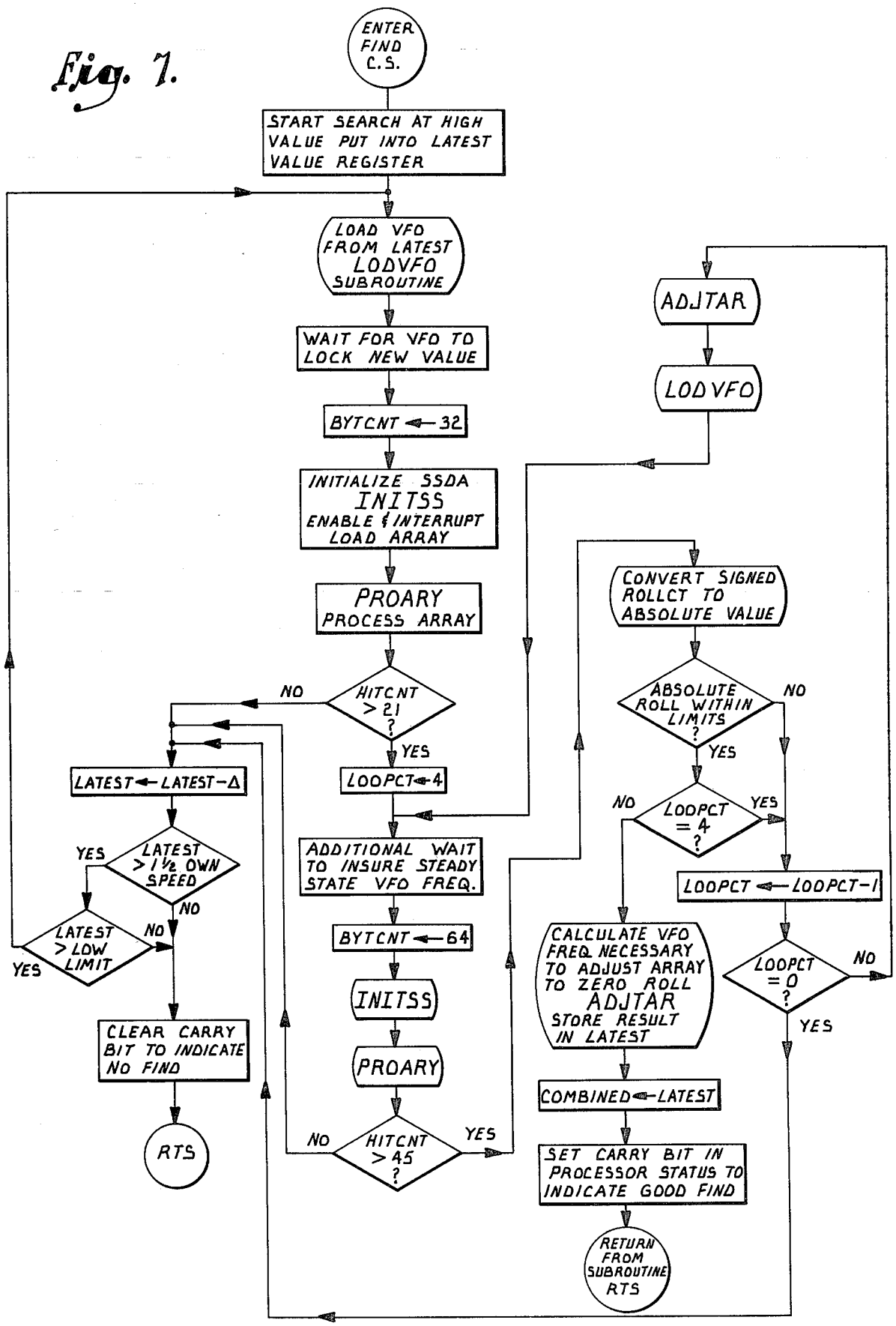
FIG. 7 is a subroutine flow chart executed by the processor for Find Combined Speed.

FIG. 7 is a major subroutine within the radar operating system and is a find combined speed subroutine, illustrating the use of PROARY and other subroutines. The executive of the system will call this routine when it is ready to determine or search for a new combined speed value. This routine operates with a latest value register and starts the search at a high value corresponding in this particular invention with a combined speed of about 180 mph. Following this initialization, the VFO is loaded from the latest value register (LATEST). This is a 10 bit value which can generate 1024 possible VFO frequencies. The hardware necessary to accomplish this was previously discussed and involves the loading of a digital number from LATEST into the outputs of the 6820 PIA (Doppler Board FIG. 2b).

Next, a time delay is generated to allow the VFO to lock to the new programmed value, the byte counter is loaded with 32 and another subroutine is called, called INITISS. This subroutine initializes the SSDA and includes the code given in FIG. 6 which enables the interrupt and allows the array to begin loading. Concurrently with this loading process, the subroutine PROARY is called. PROARY has been discussed and is shown in FIGS. 3a and 3b.

Exiting PROARY, the hit counter is compared for a hit count greater than 21. If there have been less than 21 hits in the PROARY routine, the array is defined as bad, and branch is taken where LATEST is subtracted by a delta value to assume a new trial value. It is then compared with 1½ times own speed because it has been found not to be desirable to search down to an own speed value (patrol speed) in moving mode.

For example, if the patrol car is operating operating at a speed of 50 mph the combined speed of it and the car approaching at 25 mph would be 75 mph. The radar for operating reasons does not search below ½ of its own speed, which results in 1½ times own speed computation. If the police car is moving at a very low speed it is also necessary to test whether the search has reached another low limit. In this particular invention, this is about 8 mph as the system is starting into the noise limitations from 1/F noise contribution. If either of these low limits is reached as shown by the NO out of the decision blocks, the carry bit will be cleared in the processor status to indicate a NO find to the executive that called the routine. This routine will then return to the calling point in the calling program. If these low limits are not reached, the program will branch around and load the VFO. The new LATEST value, which has had delta just previously subtracted from it, will again be programmed into the VFO and the system will continue to process 32 byte arrays at decreasing trial values of speeds. If a hit is made on a 32 byte array which corresponds to 16 cycles of input signal, a loop counter is set to the initial value of 4. Then an additional time delay is generated to insure that the VFO frequency has reached a steady state value as prior to this point, the VFO has been very rapidly moved down to new trial values. BYTCNT is loaded to the value 64 and again the subroutines INITISS and PROARY are called, operating as discussed previously.

A hit counter of greater than 45 is next tested for, meaning that any hits of greater than 45 out of 64 will be considered as a valid input signal. If a hit is not found, the program branches to subtract delta from LATEST, as was previously discussed. If the hit count is valid, the system converts the roll count to an absolute value number, as roll count not is allowed to be either a negative or positive number as was discussed in the process array subroutine discussion. The absolute roll is compared to be within certain limits. It has been determined that the roll should be equal to or less than a certain minimum value, although not necessarily locked to zero, in order to go onto a display. This insures that the speed displayed for violation purposes will be accurate under all circumstances. If the roll is within limits, the loop counter is compared to see if it is still equal to four. If it is equal to four, then only one pass has been made through a 64 byte array and the system is designed so that more than one pass through the array with hits over 45 is necessary in order to use the combined speed. If loop count is equal to four or if the absolute roll is not within limits, the program branches to a point where it decrements the loop counter.

After decrementing the loop counter, the loop counter is tested for zero value and if the loop counter has reached zero then the system has tried to stabilize the absolute roll within the minimum limits for 4 times and been unsuccessful. If this is the case, the trial value at the last value is abandoned and delta is subtracted from the latest value causing it to again pass through the major loop and test 32 bytes. If the loop counter has not reached zero, the system will call the ADJTAR routine which is an adjust array routine. This routine, not shown in detail, calculates the VFO frequency (new LATEST number) which would have been necessary to adjust the previous array to zero roll. It then loads the VFO with the new calculated value and reenters the 64 byte process array loop just below the point where the loop counter is set to 4.

On again initializing the SSDA, processing the array and finding a hit count greater than 45, the program again tests for roll count within the acceptable limits and if loop count is not equal to 4, that is on this pass the loop count will be no greater than 3 so it will pass this test, indicating that it has been around the loop at least once. Again, ADJTAR will be called. Any small correction of the VFO necessary to adjust the array will be accomplished, the output of this will be stored in a register called COMBND, which will tell the calling program that a combined speed has been found. The carry bit will be set in the processor status register, indicating a good find, and the subroutine will return to the calling program.

The procedure for finding patrol car speed is similar to that of finding combined speed. The primary difference is in the selection of the band pass output in the case of a combined speed find.

If a valid combined speed has been found, the executive routine of the system tests to see if the last found valid patrol vehicle speed is still valid, i.e., there have been no more than a few seconds elapsed since the last good vertification of patrol car speed.

If both speeds are valid, the patrol speed number is arithmetically subtracted from the combined speed number with the difference being target speed. Target speed is then converted to appropriate units, as previously discussed and displayed.

If the unit is in the stationary mode of operation, the executive routine forces the patrol speed number to zero and considers it to be always valid. The system next compares the target speed with the thumbwheel switch setting. If the target speed is equal to or greater than the thumbwheel setting, a "violation" has occurred, except in the special case of an all zero setting which disables a thumbwheel violation.

One of the features of the present invention is the High Speed Lock (HSL) mode of operation. If the operator has selected HSL on the front panel control, the device will deliver one audible beep on the event of violation. It will not attempt final lock until either the target speed or patrol vehicle speed becomes invalid, or until the target speed drops a predetermined value below the highest speed reached.

After the initial violation beep, each time the target speed increases by one unit of speed, the new target speed is stored as the highest speed reached. For example, if the target vehicle is accelerating, the unit will beep at the first unit of speed increment equal to or greater than the thumbwheel setting. As the target begins to slow down and its speed falls below the highest speed reached by a predetermined amount, the unit will attempt final lock. If the signal becomes invalid, the prelock flag has been set, the unit will also attempt final lock. As previously discussed, the device will perform an automatic calibration procedure and must pass this test prior to locking the target speed into the display.

If the radar is in the HSL mode, the speed which will be locked will be the highest violation speed reached while the target was within the radar beam. If not in HSL mode, the device will immediately lock the first target speed reading which is above the thumbwheel setting, subject to passing an automatic calibration test.

Figure 10:
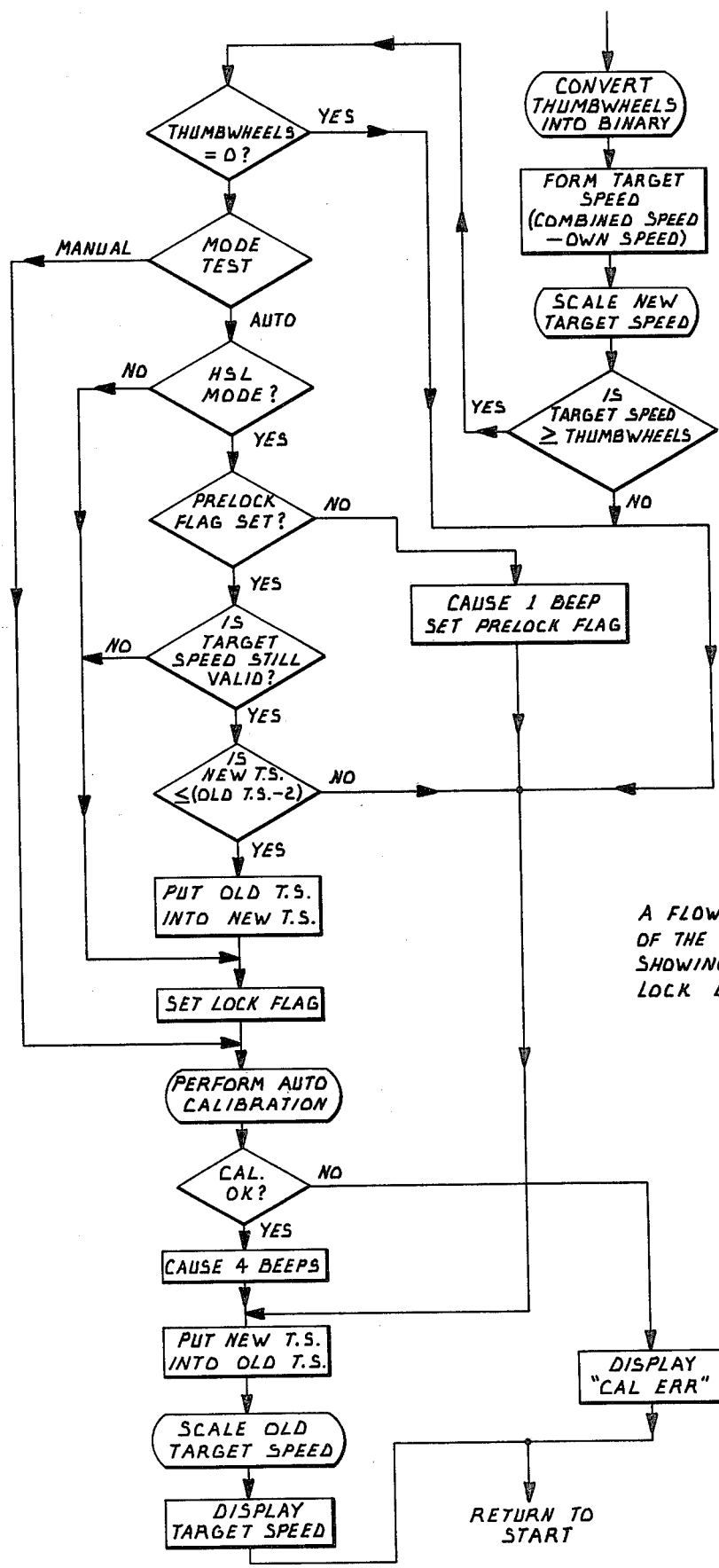
FIG. 10 is a flowchart of a portion of the executive routine showing the high speed lock logic.

Reference to FIG. 10 illustrates the high speed lock operation. On entering this portion of the executive routine, the thumbwheel information is first converted into binary form so that it can be compared in binary notation as the speeds that the radar device is using are in binary form as opposed to BCD form. Next, the target speed is generated by subtracting the own speed (platform speed) number from the combined speed number and a subroutine is called which scales this new target speed to units equivalent to those on the front panel thumbwheel indicators. Next the system tests to see if the target speed is greater than or equal to the number on the thumbwheels and, if not, the program branches around the next series of logic as no violation has taken place. However, in the thumbwheels are all set to zero, which would create a violation for any target speed number, the program branches around the violation logic and can only be locked by a manual entry (actual operation by the operator). However, if the target speed is greater than the thumbwheels and the thumbwheels are not set on zero, the next test determines whether the unit is in manual mode or automatic mode. If in manual mode, the unit will enter a temporary lock-up condition which causes a four beep alarm and then exit. The lock flag in such a case will not be set and the unit will not stay in the lock condition. If the unit is in automatic mode, then the next test is one to determine if the high speed lock buttom is depressed. If not, the system branches around and sets the lock flag immediately causing this first violation to set the lock flag and cause a four beep lock condition which will remain in the lock condition until manually released by the operator. If the device is in the high speed lock mode, the next test is to determine whether the prelock flag is set. If the prelock flag is not set, then this is the first target speed which is above or equal ot the thumbwheel limits and a system causes a single beep and sets a location in memory designating the prelock flag to a non-zero condition. It then branches around to a lower point in the program which updates the display to show the most recent target speed. If the prelock flag has been set the system makes a test to see if the target speed is still valid. If there has been any loss of either patrol car speed or loss of combined speed for a predetermined maximum amount of time, then the target speed cannot be valid and the program branches to a point where it sets the lock flag and proceeds into final lock subject, of course, to the automatic calibration discussed infra. The next test determines if the new target speed is less than or equal ot the old target speed minus two. This allows the speed to fall off by a predetermined limit from its maximum value before an alarm condition is achieved. If the new target speed is not less than the old target speed minus two, the program takes the branch to put the new target speed into the old, then to scale this target speed and to display it. If the new target speed is less than the old, the program puts the old target speed into the new target speed memory location. It then sets the lock flag and performs an auto calibration. If the calibration is passed, the unit will cause four beeps and display the last good target speed. If the calibration is failed, the unit displays a CAL ERR message in the two display windows. It should be noted that on any path through the routine which sets the lock flag for a permanent lock condition, an automatic calibration is performed. In addition, if the unit is in manual mode and a violation has occurred, the automatic calibration will again be invoked prior to a final display of target speed. On exiting the program shown in FIG. 10, the executive routine returns to a start position, where it begins another loop through the program.

A further feature of the device which is associated with the automatic calibration function is a software routine which initiates a compariosn between the system time base and the microprocessor clock each time the unit is turned on. As part of the "power-on" sequence, all display segments are illuminated and then a calibration test is performed. If the test is failed, the unit displays "CAL ERR", indicating to the operator that its accuracy is in doubt. This concept has also been disclosed in the Goodson, et al. co-pending application Ser. No. 896,373 filed simultaneously with this application, owned by the same assignee, and entitled "Speed Measuring Device".

The hardware design of the unit is such as to include a socket and appropriate wiring to connect an additional PIA device into the system buss structure in a fashion identical to that of I-12 (FIG. 2b) except for address selection. The I/O pins of this PIA, when installed, are brought to a connector on the rear panel. By installing the additional PIA in the device and modifying the firmware (ROM) it is possible, with no additional change in hardware, to program the radar device to drive or receive information from accessory devices such as printers, cameras or other peripherial systems. This provides for a high degree of flexability in the radar device in meeting the requirements of specific applications.

From the foregoing, it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

The following table lists the various integrated circuits used on the Doppler board, the filter board and the CPU board of the present disclosure along with a reference to publications providing circuit data.

DOPPLER BOARD
Reference: Motorola, Semiconductor Data Library, Vol. 5/ Series B 1976.

| Circuit No. | | Description | Page No. |
|---|---|---|---|
| I-1 | MC14040B | McMOS MSI 12-Bit Binary Counter | 5-103 |
| I-2 | MC14001B | McMOS SSI Quad 2-input NOR Gate | 5-9 |
| I-4 | MC14526B | McMOS MSI Divide-By-N4 Bit Counter | 5-325 |
| I-5 | MC14526B | McMOS MSI Divide-By-N4 Bit Counter | 5-325 |
| I-6 | MC14526B | McMOS MSI Divide-By-N4 Bit Counter | 5-325 |
| I-7 | MC14046B | McMOS Phase-Locked Loop | 5-115 |
| I-8 | MC14011B | McMOS SSI Quad 2-input Nand Gate | 5-29 |
| I-9 | MC14520B | McMOS MSI Dual Binary Up-Counter | 5-305 |
| I-10 | MC14053B | McMOS MSI Analog Multiplexer/ Demultiplexor | 5-124 |

FILTER BOARD
Reference: Motorola, Semiconductor Data Library, Vol. 5/ Series B 1976.

| Circuit No. | | Description | Page No. |
|---|---|---|---|
| I-1 | MC14528B | McMOS MSI Retriggerable/ Resettable Monostable/Multi-vibrator | 5-332 |
| I-2 | MC14011B | McMOS SSI Quad 2-input Nand Gate | 5-29 |
| I-4 | MC14066B | McMOS SSI Quad Analog Switch | 5-130 |
| I-6 | MC14066B | McMOS SSI Quad Analog Switch | 5-130 |
| I-8 | MC14046B | McMOS MSI Phase-Locked Loop | 5-115 |

Reference: National Semiconductor, Linear Data Book, June 1976.

| I-9 | | LM393A Dual Voltage Comparator | 5-43 |
|---|---|---|---|
| I-13 | | LM393A Dual Voltage Comparator | 5-43 |

Reference: Texas Instruments, Linear Control Circuits Data Book, 1976.

| I-3 | 4558 | (MC1458) Dual General Purpose Operational Amplifier | 91 |
|---|---|---|---|
| I-5 | 4558 | (MC1458) Dual General Purpose Operational Amplifier | 91 |
| I-7 | 4558 | (MC1458) Dual General Purpose Operational Amplifier | 91 |
| I-10 | 4558 | (MC1458) Dual General Purpose Operational Amplifier | 91 |
| I-12 | 4558 | (MC1458) Dual General Purpose Operational Amplifier | 91 |
| I-14 | 4558 | (MC1458) Dual General Purpose Operational Amplifier | 91 |

CPU BOARD
Reference: Motorola, M6800 Microcomputer System Design Data No. 9701-11 7/1977

| Description | Page No. |
|---|---|
| MC6800 MOS Microprocessor | 21 |
| MCM6810A MOS Random Access Memory | 111 |

Reference: Texas Instruments, TTL Data Book, Second Edition 1976

| 74LS139 TTL MSI Decoder/Demultiplexer | 7-134 |
|---|---|
| 74LS00 TTL Quad 2-Input NAND Gate | 6-2 |
| 74LS02 TTL Quad 2-Input NOR Gate | 6-8 |

Reference: Fairchaild, Bipolar Memory Data Book 1976

| 93448 Isoplanar Schottky TTL Memory | 7-114 |
|---|---|

Reference: MOS Technology, Inc., Preliminary Data Sheet (6803) Feb. 1977

MCS6532 Memory, I/O, Timer Array
Reference: Motorola MC6875 Data Sheet    1978

-continued

MC6875 MOS M6800 Clock Generator/Driver

We claim:

1. A Doppler radar device for use in law enforcement and service vehicle speed surveillance and for determining the speed of a moving target vehicle when the radar platform vehicle is either moving or stationary, the device comprising:
    means for receiving a Doppler signal,
    means for generating a time base,
    means for generating a shift clock signal having a rate related to the time base,
    means for converting said received Doppler signal into a binary signal,
    means for sampling said binary signal at said shift clock signal rate, and
    means for processing said sampled signal to determine the presence of a preselected relationship between said shift clock rate and said sampled signal in order to validate said received Doppler signal.

2. The combination as in claim 1 including means for storing said sampled signal prior to the operation of said processing means.

3. The combination as in claim 1 including means for converting said sampled binary signal into multiple bit oriented data.

4. The combination as in claim 3 including means for arraying said multiple bit oriented data prior to the operation of said processing means.

5. In a Doppler radar device for use in law enforcement and service vehicle speed surveillance and for determining the speed of a moving target vehicle when the radar platform vehicle is either moving or stationary, the device comprising:
    means for receiving a Doppler signal,
    means for processing said received Doppler signal,
    means for displaying the speed of the moving target vehicle,
    means for generating a first time base,
    means for generating a second time base,
    means for determining the existance of a preselected relationship between said first and second time bases, and
    means for controlling the display means in accordance with said preselected relationship.

6. A combination as in claim 5 including means for generating a shift clock signal having a rate related to one of said time bases,
    means for converting said received Doppler signal into a binary signal,
    means for sampling said binary signal at said shift clock signal rate, said processing means operable with respect to said sampled signal to determine the validity of said received Doppler signal.

7. The combination as in claim 6 including means for arraying said sampled binary signal prior to the operation of said processing means.

8. The combination as in claim 6 including means for storing said sampled signal prior to the operation of said processing means.

9. The combination as in claim 6 including means for converting said sampled binary signal into a multiple bit oriented data.

10. The combination as in claim 9 including means for arraying said multiple bit oriented data prior to the operation of said processing means.

11. A Doppler radar device for use in law enforcement and service vehicle speed surveillance and for determining the speed of a moving target vehicle when the radar platform vehicle is either moving or stationary, the device comprising:
means for receiving a composite Doppler signal,
filter means for separating said Doppler signal into two frequency components one of said components being related to target vehicle speed and the other component being related only to platform vehicle speed when said platform vehicle is moving,
means for generating a time base,
means for generating a shift clock having a rate related to the time base,
means for converting said received Doppler signal into a binary signal,
means for sampling said binary signal at said shift clock rate, and
means for processing said sampled signal to determine the presence of a preselected relationship between said shift clock rate and said sampled signal in order to validate said received Doppler signal.

12. The combination as in claim 11 wherein said filter means includes a tunable notch, and means for steering said notch to the frequency component of said platform vehicle.

13. The combination as in claim 11 wherein said filter means includes at least one transmission gate operated in a binary or on-off fashion, and wherein the on-off ratio of the binary controlled gate is varied to effect a continuously tuned element of said filter means.

14. The combination as in claim 11 wherein said filter means includes a continuously tunable circuit element, and means for controlling said circuit element as a function of the duty factor thereof.

15. The combination as in claim 11 wherein said filter means includes a continuously tunable element, and a means for controlling said element as a function of the duty factor thereof, a one shot multivibrator interconnected with said continuously tunable element within said filter means so that said duty factor is produced by controlling the output of said one shot multivibrator at a variable frequency rate.

16. The combination as in claim 11 wherein said filter means is tunable to a frequency for composite signal separation, and microprocessing means for effecting said tuning of said filter means.

17. A Doppler radar device for use in law enforcement and service vehicle speed surveillance and for detecting and determining the speed of both a moving target and a radar platform vehicle when said radar platform vehicle is moving, said device comprising:
means for receiving a composite Doppler signal,
means for processing said received composite Doppler signal,
means for displaying said speed of said moving target vehicle, and
means for limiting the range of detection of the target vehicle without affecting the detection of the platform vehicle speed.

18. In a Doppler radar device for use in law enforcement and service vehicle speed surveillance and for determining the speed of a moving target vehicle when said platform vehicle is moving, the device comprising:
means for causing said device to emit radiated RF energy for producing a received Doppler signal from said moving target vehcle,
means for controlling said radiated RF energy to decrease the probability of detection of same by a traffic radar detector.

19. The combination as in claim 18 including:
means for determining the platform vehicle speed frequency, said determining means including a filter means tunable to more than one frequency,
circuit means for maintaining a frequency condition of said filter means relative to said platform vehicle speed frequency, and
means operable in conjunction with said maintaining means for verifying said platform vehicle speed frequency after operation of said RF energy controlling means.

20. In a Doppler radar device for use in law enforcement and service vehicle speed surveillance and for determining speed of a moving target vehicle when a radar platform vehicle is either moving or stationary, the device comprising:
means for receiving a Doppler signal,
means for processing said received Doppler signal with respect to a time base,
means for displaying said speed of said target vehicle in more than one unit of measure, and
means for converting from one unit of measure to another without modifying said time base.

21. The combination as in claim 20 including a microprocessor means for sensing the presence of a circuit element and thereby effecting the operation of said converting means.

22. In a Doppler traffic radar device, said device comprising:
means for receiving a Doppler signal corresponding to the speed of a target vehicle,
means for processing said signal in order to determine the validity of said signal,
means for tracking the speed of the target vehicle,
means for storing the maximum speed of the target vehicle that was tracked by said tracking means,
means for displaying a speed of the target vehicle, and
means for causing the display means to display the maximum speed obtained by said target vehicle.

23. A Doppler radar device implemented method for use in law enforcement and service vehicle speed surveillance and for determining the speed of a moving target vehicle when the the radar platform vehicle is either moving or stationary, said method comprising the steps of:
receiving a Doppler signal,
generating a time base,
generating a shift clock signal having a rate related to the time base,
converting said received Doppler signal into a binary signal,
sampling said binary signal at said shift clock signal rate, and
processing said sampled signal to determine the presence of a selected relationship between said shift clock rate and said sampled signal in order to validate said received Doppler signal.

24. In a Doppler radar device for use in law enforcement and service vehicle speed surveillance and for determining speed of a moving target vehicle when a radar platform vehicle is either moving or stationary, the device comprising:
- means for receiving a Doppler signal,
- means for generating a time base,
- means for converting said received Doppler signal into a binary signal,
- a microprocessor means, means connecting said time base to said microprocessor means, and
- means for inputing said binary signal to said microprocessor means, said microprocessor means being operable to determine the validity of said Doppler signal.

25. The device as in claim 24 including: means for receiving or transmitting data or control information associated with accessory devices, said receiving or transmitting means being under control of said microprocessor.

26. In a Doppler radar device for use in law enforcement for determining the speed of a moving target vehicle when a radar platform vehicle is either moving or stationary, the device comprising:
- means for receiving a Doppler signal,
- means for processing said received Doppler signal,
- means for displaying speed of a target vehicle,
- means for detecting that said device has initially had its power turned on,
- means for generating a first time base,
- means for generating a second time base,
- means for determining the existence of a preselected relationship between said first and second time bases, and
- means for controlling the display means in accordance with said preselected relationship.

* * * * *